(12) United States Patent
Takahashi et al.

(10) Patent No.: US 7,055,163 B2
(45) Date of Patent: May 30, 2006

(54) DISC CARTRIDGE AND DISC DRIVE

(75) Inventors: Akira Takahashi, Nara (JP); Hideharu Tajima, Tenri (JP); Nobuyuki Takamori, Kitakatsuragi-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 166 days.

(21) Appl. No.: 10/004,564

(22) Filed: Dec. 5, 2001

(65) Prior Publication Data

US 2002/0071375 A1 Jun. 13, 2002

(30) Foreign Application Priority Data

Dec. 8, 2000 (JP) .............................. 2000-375127

(51) Int. Cl.
*G11B 23/03* (2006.01)
(52) U.S. Cl. .................................................... 720/725
(58) Field of Classification Search ................ 360/133; 369/77.2, 291, 75.2, 75.1, 284, 275.4
See application file for complete search history.

(56) References Cited

U.S. PATENT DOCUMENTS

| | | | |
|---|---|---|---|
| 4,278,258 A | | 7/1981 | Fujita et al. |
| 4,677,516 A | * | 6/1987 | Iizuka et al. ................. 360/133 |
| 5,202,880 A | * | 4/1993 | Lee et al. ................. 369/275.4 |
| 5,537,281 A | * | 7/1996 | Ma et al. ..................... 360/133 |
| 5,548,571 A | * | 8/1996 | Mistretta .................... 369/77.2 |
| 5,581,540 A | * | 12/1996 | Dang ......................... 369/291 |
| 5,587,994 A | * | 12/1996 | Nagaura et al. ............. 369/291 |
| 5,948,593 A | * | 9/1999 | Misawa et al. ............. 369/284 |
| 6,338,104 B1 | * | 1/2002 | Iwasaki ....................... 360/133 |
| 6,339,583 B1 | * | 1/2002 | Watanabe et al. ........... 369/291 |
| 6,379,768 B1 | * | 4/2002 | Saito et al. ................ 428/64.1 |

FOREIGN PATENT DOCUMENTS

| | | |
|---|---|---|
| JP | 59-60735 | 4/1984 |
| JP | 03-142767 | 6/1991 |
| JP | 04-067486 | 3/1992 |
| JP | 05-303770 | 11/1993 |
| JP | 06-012816 | 1/1994 |
| JP | 07-320359 | 12/1995 |
| JP | 09-040058 | 2/1997 |
| JP | 09-251748 | 9/1997 |
| JP | 10-112104 | 4/1998 |
| JP | 11-238335 | 8/1999 |
| JP | 2000-082236 | 3/2000 |
| WO | WO 98/14941 | 4/1998 |

OTHER PUBLICATIONS

Full English-language translation of Japanese Publication 04-067486 (published Mar. 1992).

* cited by examiner

*Primary Examiner*—Allen Cao
(74) *Attorney, Agent, or Firm*—David G. Conlin; Steven M. Jensen; Edwards Angell Palmer & Dodge LLP

(57) ABSTRACT

A disc cartridge of the present invention has an arrangement in which a disc cover is provided so as to cover one side of a disc in a disc shape having a recording layer for recording/reproducing information. This arrangement protects a surface for recording/reproducing from being damaged, being attached by dust, or being dirty. Meanwhile, this arrangement gives a significantly thinner thickness to the disc cartridge.

44 Claims, 27 Drawing Sheets

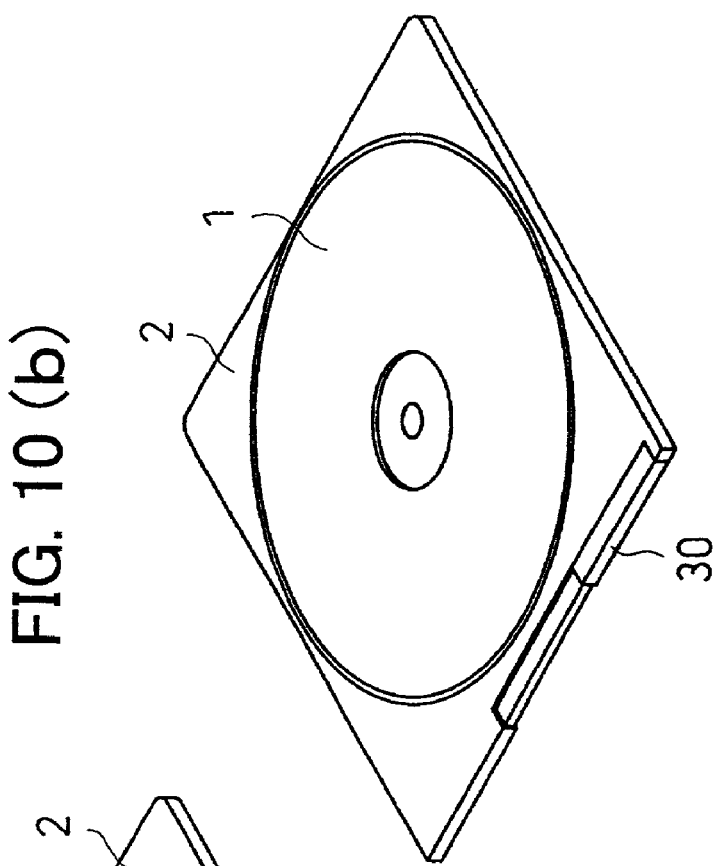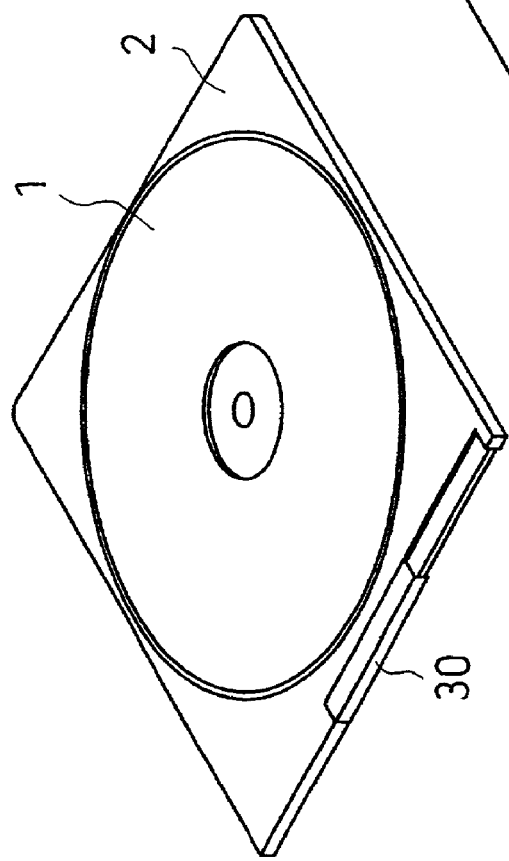

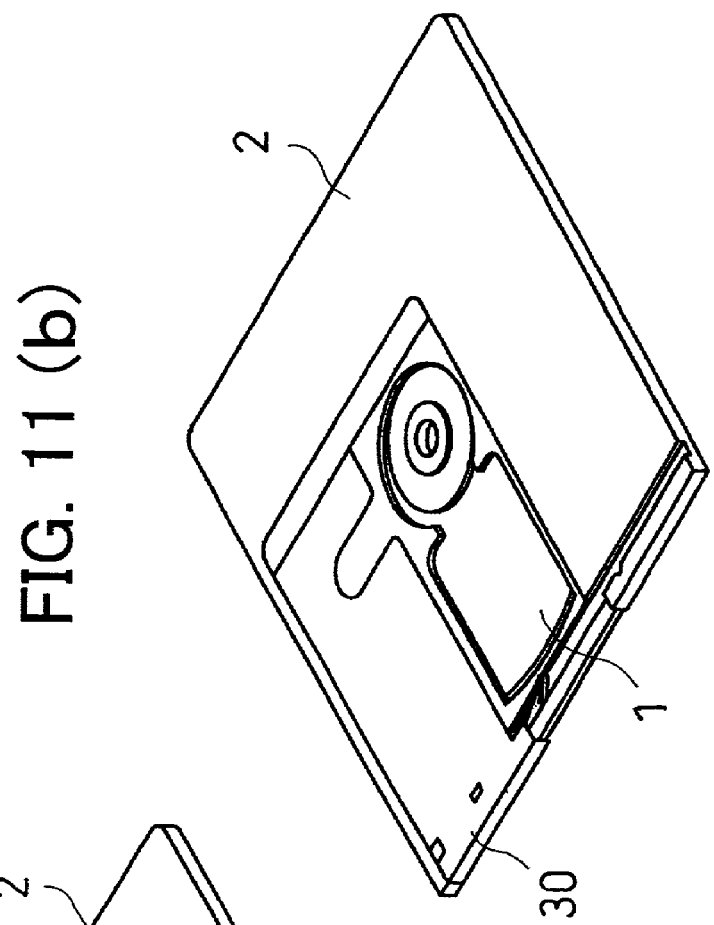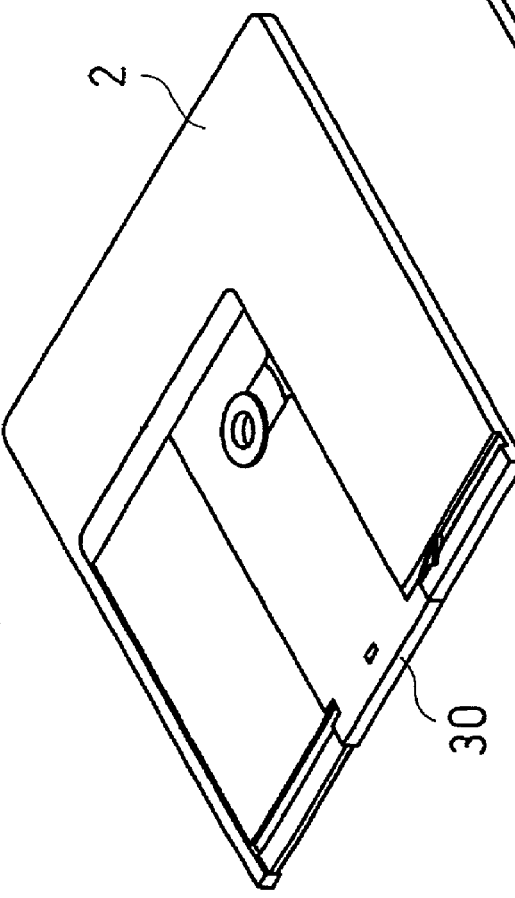

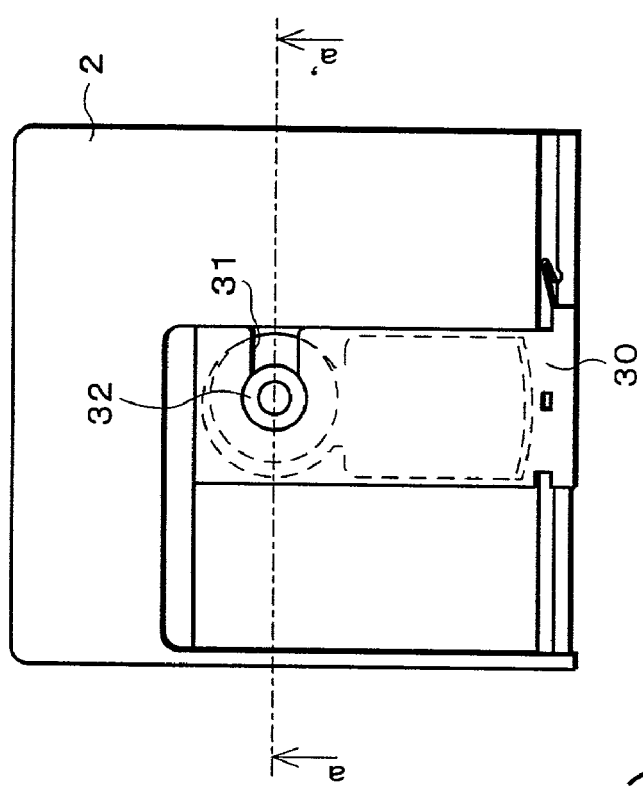
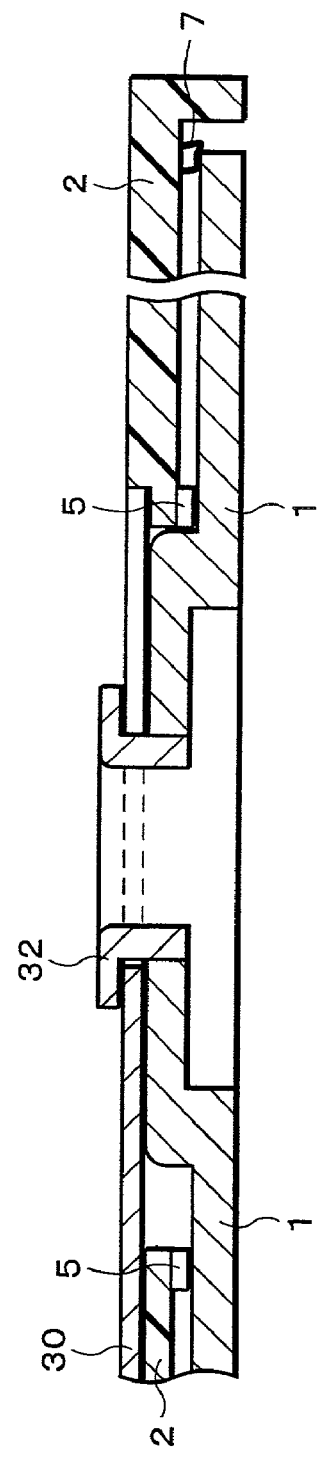
FIG. 12 (a)
FIG. 12 (b)

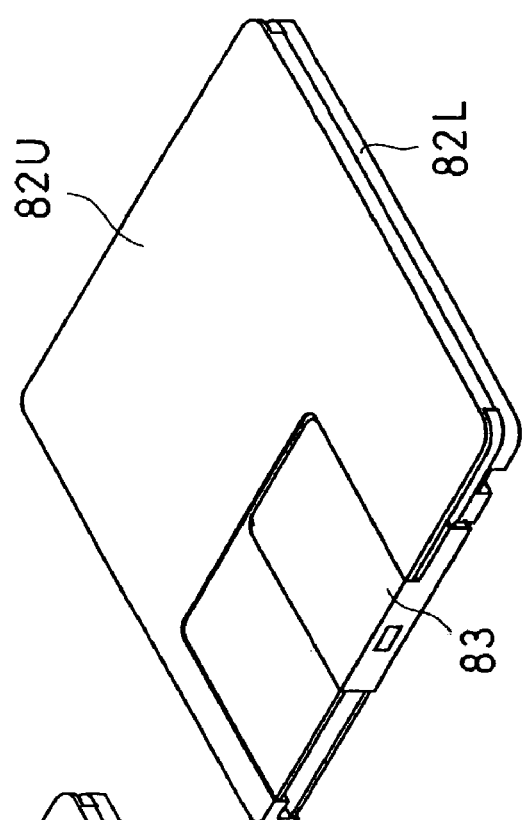
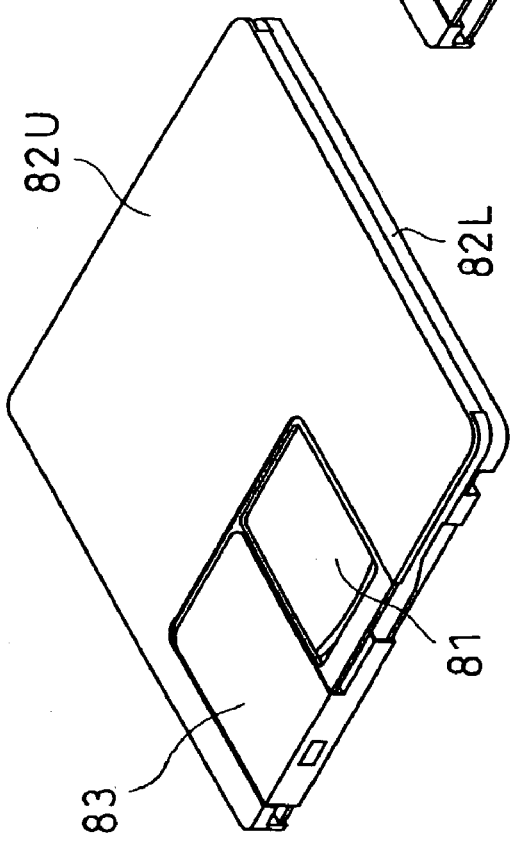

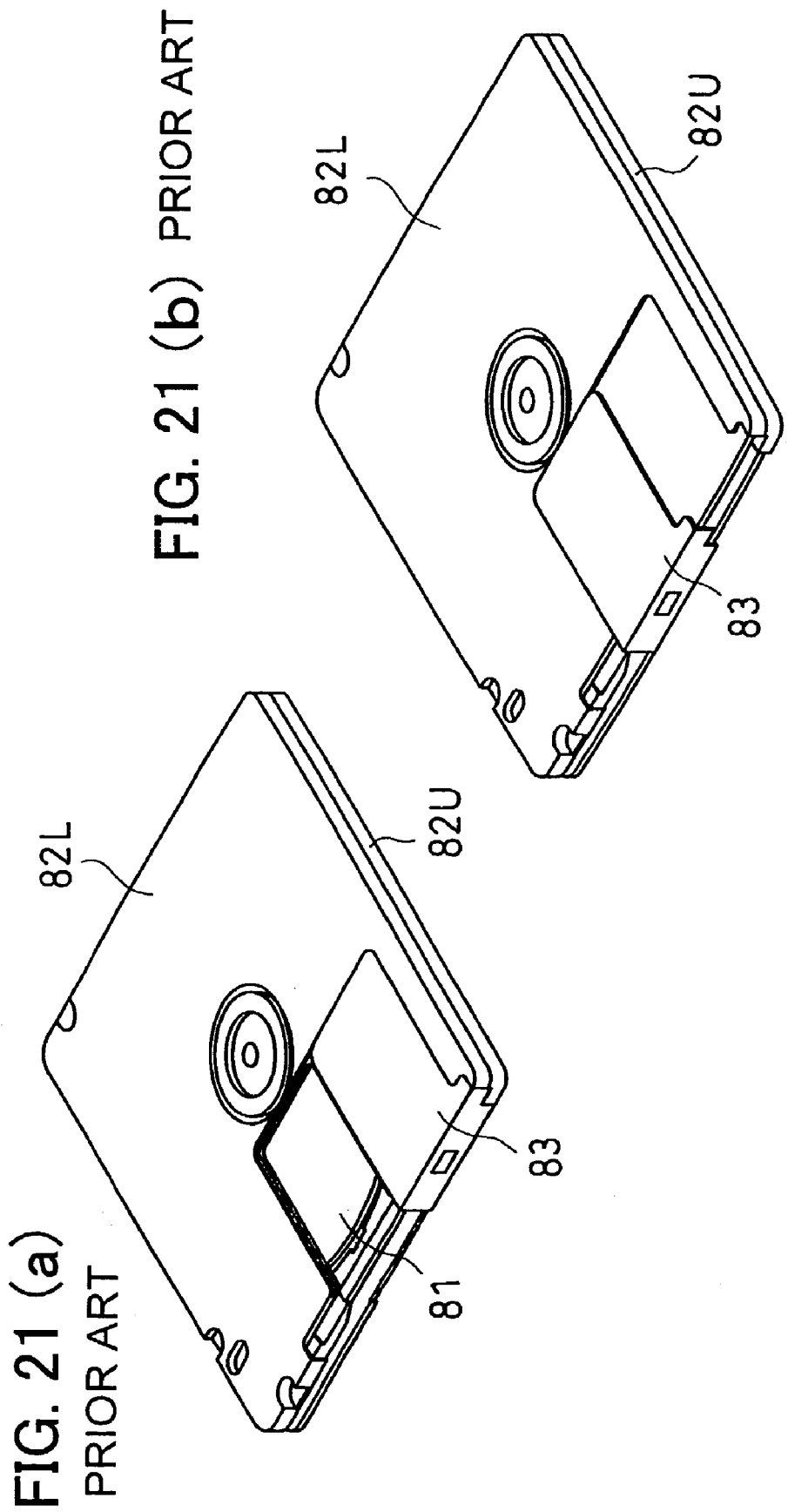
FIG. 21 (a) PRIOR ART
FIG. 21 (b) PRIOR ART

DISC CARTRIDGE AND DISC DRIVE

FIELD OF THE INVENTION

The present invention relates to a disc cartridge that is provided with a disc-type recording medium, such as an optical disc, for performing optical magnetic recording and phase change recording for example, and to a disc drive using the disc cartridge.

BACKGROUND OF THE INVENTION

Used as conventional disc device for recording digital data are, for example, a magnetic disc, which read data by detecting a magnetic change, and an optical disc, which read data by detecting light intensity of reflected light that is caused by projecting a beam, such as a laser beam.

There are an exchangeable (medium-exchangeable) magnetic disc, such as a floppy disc, a ZIP disc, and JAZ (Registered Trademark) disc and a non-exchangeable (non-medium-exchangeable) magnetic medium like a hard disc drive. In order to increase a recording density of the magnetic disc, it is necessary to reduce a space between a recording surface of the magnetic disc and a magnetic head. However, the reduction of the space makes the magnetic disc more susceptible to an adverse effect of dust. Especially, for the exchangeable magnetic disc, even if the exchangeable magnetic disc is contained in a cartridge, there is a high tendency of invasion of the dust into an inside of the cartridge, thereby posing a problem in terms of reliability of the exchangeable magnetic disc.

On the other hand, in case of the hard disc drive, which has an arrangement in which a hard disc is contained in a sealed box container, thereby not allowing the hard disc drive to be medium exchangeable, an inside of the apparatus is protected against the invasion of the dust. This has intensively encouraged the hard disc drive to have a higher recording density. However, since the hard disc drive has the arrangement not for the medium-exchange, it is necessary to install an extra hard disc drive or to transfer stored data to an exchangeable recording medium, when a storage capacity of the hard disc drive is full.

On the contrary, the optical disc has such an arrangement in which a distance between (a) a surface of the optical disc for recording information and (b) an optical head for reading the information is more than or equal to 1 mm. In other words, the optical disc is not significantly affected by the dust. Because of this, the optical disc has a comparably high recording density while the optical disc is exchangeable, thereby attaining a high popularity.

Recently, various products are provided with a disc apparatus for the optical disc. For example, if the optical disc is mounted in a portable product such as a notebook personal computer, or a portable optical disc player, it is more preferable that the disc apparatus is thinner.

A conventional optical disc has an arrangement in which a laser beam for recording/reproducing is focused on a recording surface through a substrate (made of polycarbonate, for example). For this reason, an objective lens for focusing the laser beam for reproducing should has a comparatively large diameter, so that a thickness of the substrate can be corresponded with a focal point distance. Because of this, it is necessary that a laser beam directed to the objective lens should have a comparatively large diameter, while a mirror, which reflects a light beam emitted from a laser beam source to the objective lens, should have a large size. In short, the optical head need a certain thickness. Thus, it is difficult to make the optical disc drive thinner.

Moreover, because the optical head has a comparatively heavy weight for the same reasons, the optical disc drive has a difficulty to attain a high-speed random access, unlike the hard disc drive. Thus, it is also a problem for the optical disc drive that the optical disc drive requires a longer time for reading and writing data, compared with the hard disc drive.

Furthermore, the conventional optical disc for reading and writing has an arrangement that a disc substrate having a recording film is contained in a cartridge so as not to be dusty and dirty. In order to realize a thinner disc drive, the optical disc having the arrangement is also demanded to be thinner.

SUMMARY OF THE INVENTION

The present invention has an object to provide a thin and highly reliable disc cartridge, and a disc drive for using the disc cartridge.

In order to attain the forgoing object, a disc cartridge of the present invention is provided with (a) a disc in a disc shape, including a recording layer for recording/reproducing information, (b) a disc cover for covering at least a part of one side of the disc, and (c) a connecting section for connecting the disc and the disc cover, wherein a side of the disc, which is opposite to the side of the disc covered by the disc cover, is exposed externally.

In the above arrangement, the disc cover is provided to the disc having the recording layer in such a manner that only one side of the disc is covered, while the disc and the disc cover are connected together by the connecting section. Therefore, a total thickness of the disc cartridge is a sum of a thickness of the disc and that of the disc cartridge provided only on one side of the disc. Thus, for example, compared with a disc cartridge having a disc cover on both sides of the disc, the total thickness of the disc is thinner in the above arrangement. Hence, the thinner thickness of the disc cartridge leads to reduction in the space required for the storage, improvement in portability, reduction in a thickness of the disc drive that corresponds to the disc cartridge.

In addition, because the disc cover covers the surface for recording/reproducing, which is accessed by the head for recording/reproducing information with respect to the disc, it is possible to protect the surface for recording/reproducing from being damaged, being attached by dust, or being dirty. Thus, it is possible to provide the highly reliable disc cartridge.

Moreover, a disc drive of the present invention for using a disc cartridge, which includes (a) a disc in a disc shape, including a recording layer for recording/reproducing information, (b) a disc cover for covering at least a part of one side of the disc, and (c) a connecting section for connecting the disc and the disc cover, wherein a side of the disc, which is opposite to the side of the disc covered by the disc cover, is exposed externally, the disc drive is provided with (1) a head for recording/reproducing with respect to the disc, and (2) a separating section for separating the disc and the disc cover, so as to allow the head to be inserted between the disc and disc cover so that recording/reproducing is performed.

In the above arrangement, the recording/reproducing operation is carried out by inserting the head between the disc and the disc cover that have been separated from each other by the separating section. With the above arrangement, the disc cartridge is required only to have a system for switching over whether the disc and the disc cartridge are separated from each other or not. Thus, it is possible to simplify an arrangement of disc cartridge.

Furthermore, a disc drive of the present invention for using a disc cartridge, which includes (a) a disc in a disc shape, including a recording layer for recording/reproducing information, (b) a disc cover for covering at least a part of one side of the disc, (c) a connecting section for connecting the disc and the disc cover, and (d) a shutter, being provided on the disc cover, for switching over whether the disc is exposed or unexposed, wherein a side of the disc, which is opposite to the side of the disc covered by the disc cover, is exposed externally, the disc drive is provided with (1) a head for recording/reproducing with respect to the disc, and (2) a shutter opening/closing section for opening/closing the shutter, wherein the head is moved close to the disc that is exposed through the shutter opened by the shutter opening/closing section, so that the recording/reproducing is performed.

In the above arrangement, the shutter of the disc cartridge is opened by the shutter opening/closing section so that the head carries out the recording/reproducing on an exposed region. Thus, the disc of the disc cartridge is exposed by opening the shutter, which is a relatively simple action. This simplify an arrangement for exposing the disc.

For a fuller understanding of the nature and advantages of the invention, reference should be made to the ensuing detailed description taken in conjunction with the accompanying drawings.

BRIEF DESCRIPTION OF THE DRAWINGS

FIG. 1(a) is a cross-sectional view, while FIG. 1(b) is a plan view showing a top view of FIG. 1(a).

FIG. 7(b) is a plan view of a top view of the disc cartridge, while FIG. 7(a) is a cross-sectional view taken on line a–a' of FIG. 7(b).

FIG. 8(b) is a plan view of the disc cartridge, while FIG. 8(a) is a cross-sectional view taken on line a–a' of FIG. 8(b).

FIGS. 10(a) and 10(b) are perspective views of a disc cartridge of another embodiment of the present invention, which is observed from above. FIG. 10(a) shows the disc cartridge with a shutter closed, while FIG. 10(b) illustrates the disc cartridge with the shutter opened.

FIGS. 11(a) and 11(b) are perspective views of the disc cartridge shown in FIGS. 10(a) and 10(b), observed from underneath. FIG. 11(a) shows the disc cartridge with a shutter closed, while FIG. 11(b) illustrates the disc cartridge with the shutter opened.

FIG. 12(a) is a plan view in which the disc cartridge with the shutter closed, which is observed from underneath, meanwhile FIG. 12(b) is a cross-sectional view taken on line a–a' of FIG. 12(a).

FIG. 13(a) is a plan view of the disc cartridge with the shutter opened, which is observed from underneath, while FIG. 13(b) is a cross-sectional view taken on line a–a' of FIG. 13(a).

In FIG. 15(a), the disc cartridge is inserted inmostly (most deeply) within a cartridge holder. Whereas.

FIG. 17(a) is an explanatory view that illustrates in magnification a region indicated by a reference mark B in FIG. 16. Whereas, FIG. 17(b) is a cross-sectional view taken on line A–A' of FIG. 17(a).

FIGS. 20(a) and 20(b) are perspective views showing the conventional disc cartridge observed from above. FIG. 20(a) shows the disc cartridge with a shutter opened, while FIG. 20(b) illustrates the disc cartridge with the shutter closed.

FIGS. 21(a) and 21(b) are perspective views illustrating the conventional disc cartridge observed from underneath. FIG. 21(a) shows the conventional disc cartridge with the shutter opened, meanwhile FIG. 21(b) illustrates the conventional disc cartridge with the shutter closed.

DESCRIPTION OF THE EMBODIMENTS

[First Embodiment]

Figure 1:
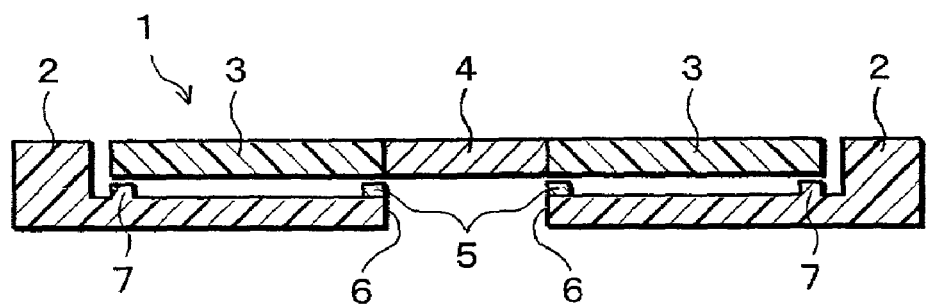
FIGS. 1(a) and 1(b) illustrate a schematic arrangement of a disc cartridge of an embodiment of the present invention.
Figure 1:
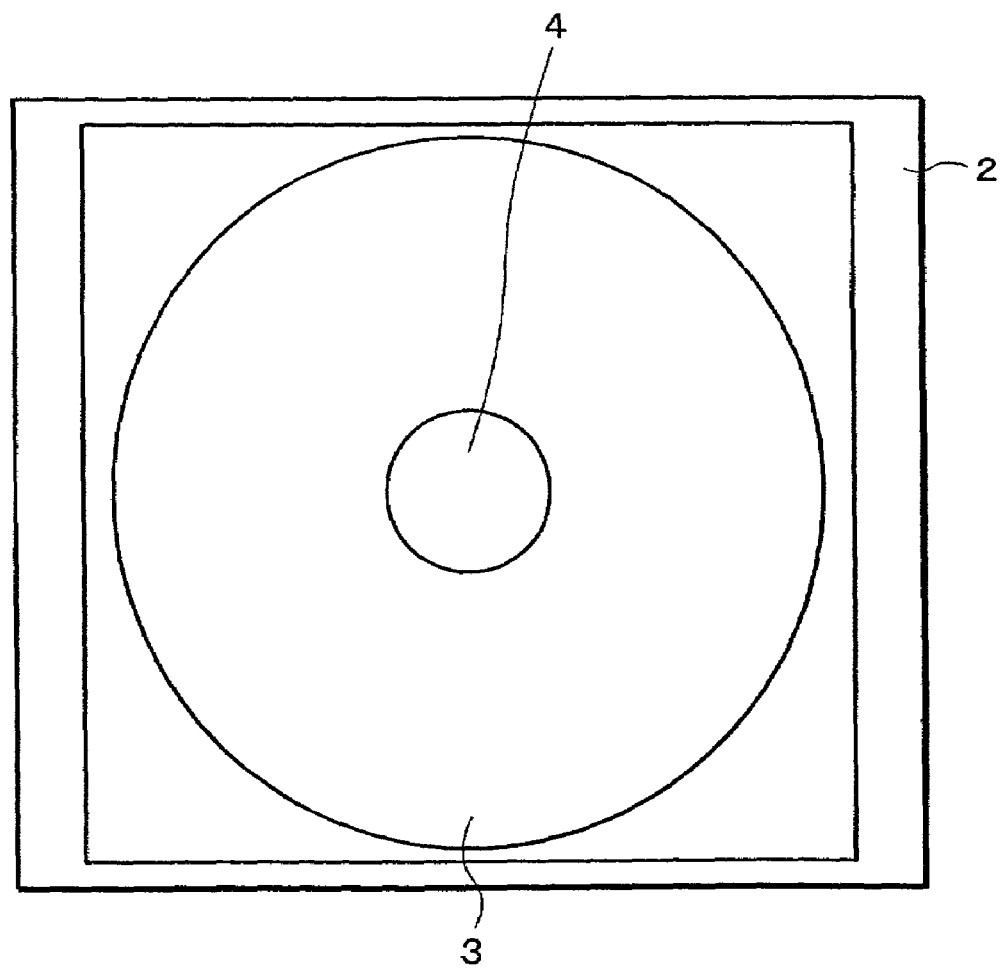

Explained below is an embodiment of the present invention, with reference to figures.

FIGS. 1(a) and 1(b) illustrate a schematic arrangement of a disc cartridge of the present embodiment. FIG. 1(a) is a cross-sectional view, whereas FIG. 1(b) is a plan view of a top view of FIG. 1(a). The disc cartridge is provided with a disc 1 and disc cover 2.

The disc 1, which is a recording medium in a disc shape, is provided with a disc section 3 and a hub section 4, which is located at a central part of the disc 1. The disc section 3 has a recording surface. As shown in FIG. 1(a), the disc cover 2 has such a shape that the disc cover 2 covers a lower part of the disc 1. Further, the disc cover 2 is provided with an opening section 6 in a region which corresponds to the hub section 4 of the disc 1. More specifically, the disc cartridge is so arranged that a lower part of the disc cartridge is covered by the disc cover 2 leaving only the opening section 6 uncovered, while an upper part of the disc cartridge exposes a top surface of the disc 1.

The disc cover 2 may be made of, for example, a resin, such as polycarbonate, ABS (acrylonitrile-butadiene-styrene), and acrylate, or a metal, such as steel and aluminum.

Moreover, the hub section 4 of the disc 1 is made of a magnetic material. Further, the disc cover 2 is provided with an inner disc touching section (inner touching section) 5, which includes a magnetic material. The inner disc touching section 5 is located at an opening of the opening section 6, which corresponds to the disc 1. Because of this, the hub section 4 and the inner disc touching section 5 pull each other by using a magnetic force, thereby keeping a state in which the disc 1 and the disc cover 2 are put together. Moreover, on the contrary, this indicates that it is possible to separate the disc 1 and the disc cover 2 by applying an external force stronger than the magnetic force in a direction to separate the disc 1 and the disc cover 2.

It should be noted that, as explained latter in detail, the inner disc touching section 5 need not be made of the magnetic material as such, in case a system for locking the disc 1 and the disc cover 2 together.

Moreover, the disc cover 2 is provided with an outer disc touching section (outer touching section) 7 in such a position that corresponds to a vicinity of an outer circumference of the disc 1. In other words, the disc 1 is supported by the disc cover 2 in such a manner that the inner disc touching section 5 holds an inner circumference part of the disc 1, while the outer disc touching section 7 supports the outer circumference part of the disc 1.

Figure 2:
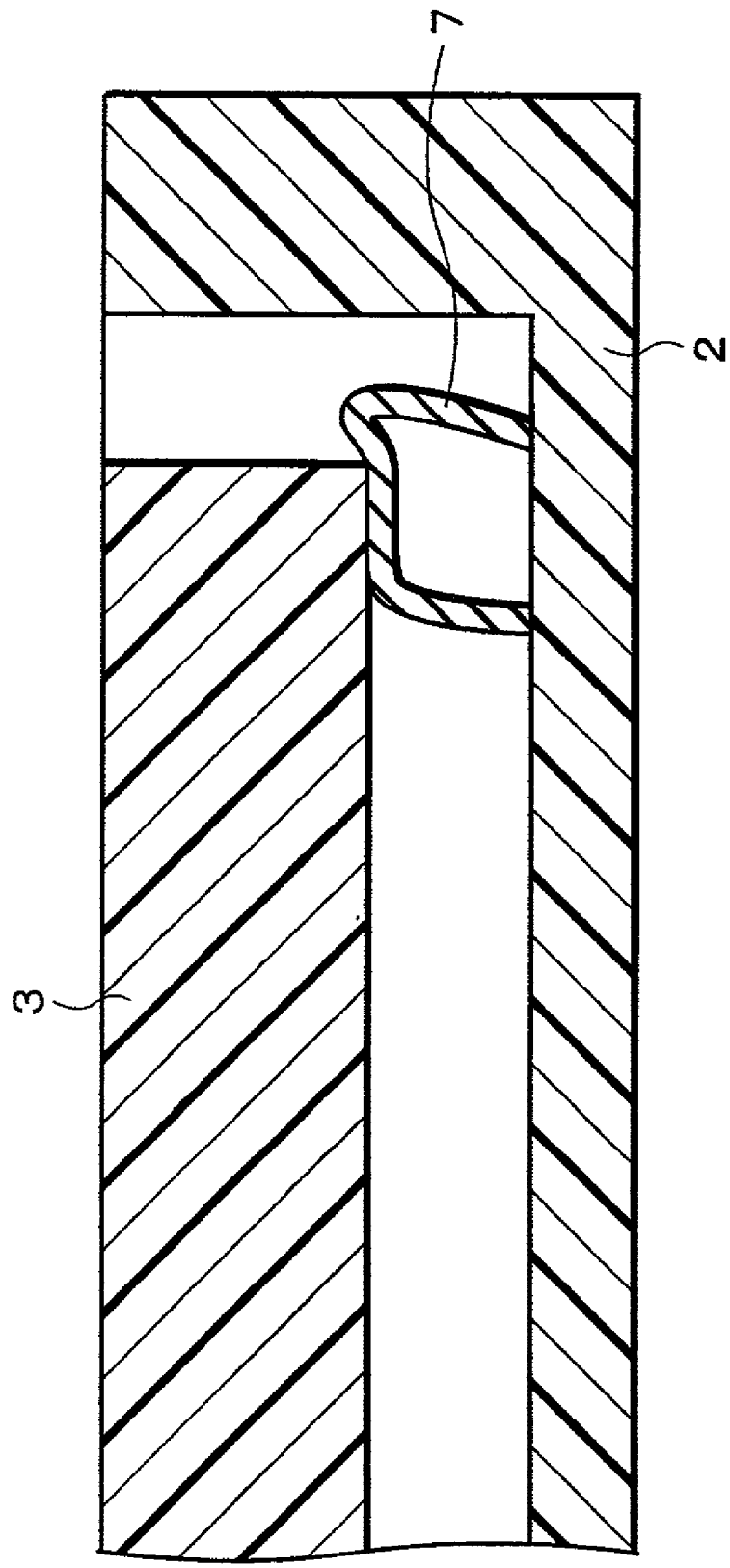
FIG. 2 is a cross-sectional view illustrating in magnification an outer disc touching section provided in the disc cartridge.

FIG. 2 is a cross-sectional view showing in magnification a vicinity of the outer disc touching section 7. As shown in FIG. 2, the outer disc touching section 7 is made of an elastic material and has a hollow structure. Examples of the elastic material for the outer disc touching section 7 include rubber. In this manner, an outer circumference part of the disc section 3 is supported by an elastic force of the outer disc touching section 7. This makes it possible that an impact externally applied on the disc 1 is absorbed by the elastic force of the outer disc touching section 7, thereby protecting the disc 1 from being damaged.

Moreover, it is preferable that the inner disc touching section 5 has such an touching surface that is made of the elastic material such as rubber with respect to the disc 1, even though it is not illustrated here. Because of this, the impact can be absorbed while a damage on a part of the disc 1, which is touched by the inner disc touching section 5, can be prevented.

Figure 3:
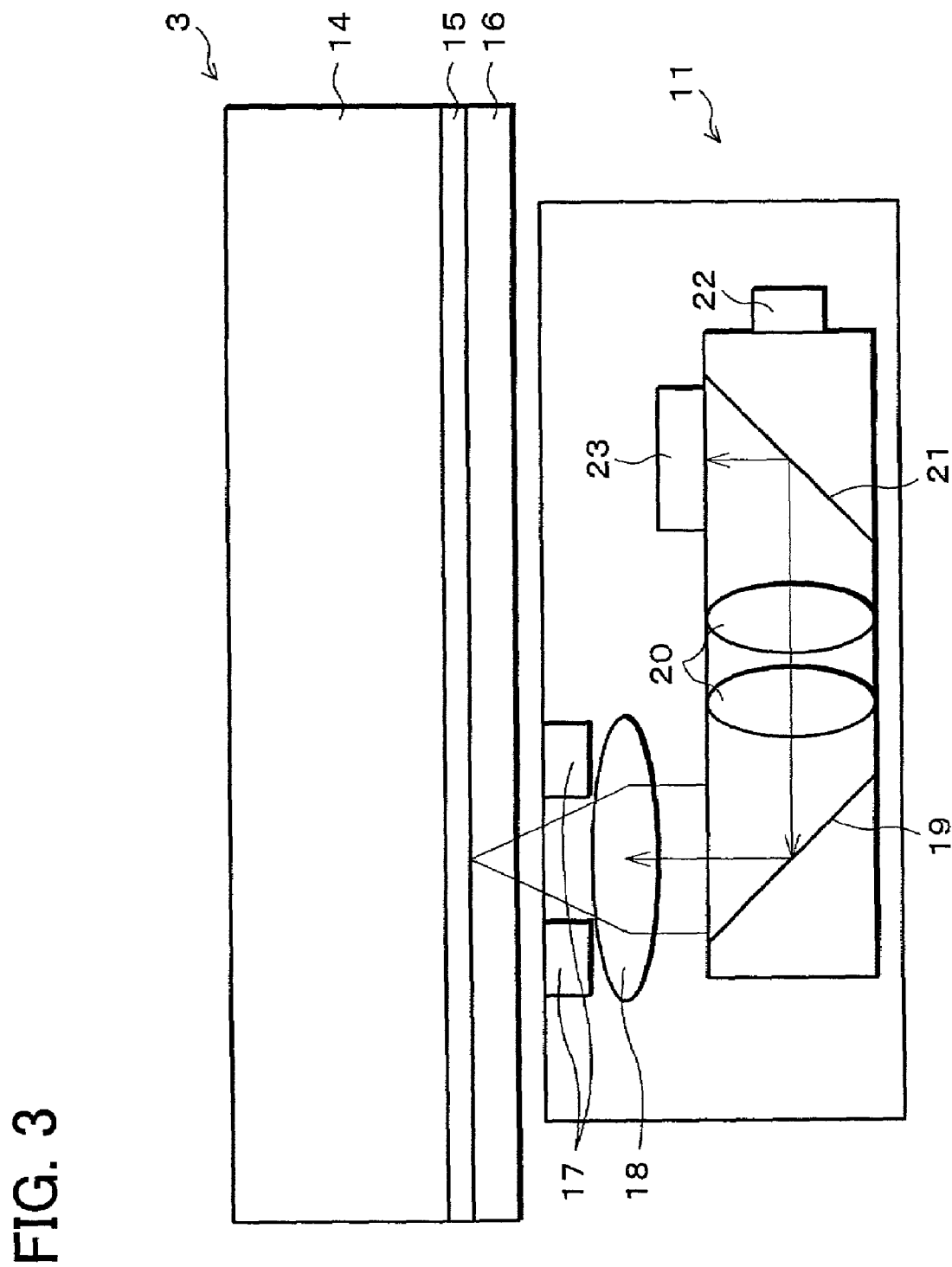
FIG. 3 is an explanatory view showing an arrangement of a disc section of the disc cartridge, and a head for recording/reproducing with respect to the disc section.

Next, described is an arrangement of the disc section 3 and an arrangement of a head 11 for recording/reproducing with respect to the disc section 3. FIG. 3 is an explanatory view showing the arrangements of the disc section 3 and that of the head 11 for recording/reproducing with respect to the disc section 3.

As shown in FIG. 3, the disc section 3 is provided with a disc substrate 14, a recording film (recording layer) 15, and a protective film (protective layer) 16, which are laminated in this order with respect to a surface of the disc substrate 14 onto which a laser beam from the head 11 is directed (light incident surface).

The disc substrate 14 is a substrate for the disc section 3. The disc substrate 14 may be made of any material, for example, resins such as polycarbonate, ABS, and acrylate, metals, such as steel and aluminum, and glasses such as reinforced glass. Because the resins are manufactured by compression molding, the resins are advantageously suitable for mass production, while its low material cost is another advantage of the resins. The metals are advantaged by its easy production due to press working, and by its cheap and hard raw material. The glasses are excellent in flatness and hardness, and optically stable, advantageously. Moreover, because a surface (exposed surface) of the disc substrate 14 opposite to the light incident surface is exposed externally, as shown in FIG. 1, it is preferable that the disc substrate 14 is made of a material that is hard enough to protect the exposed surface from being damaged, and has an anti-static property for dustproof.

The recording film 15 is made of a recording film material that is suitable for phase change recording and optical magnetic recording. As to a raw material, conventionally used recording film materials may be used. Thus, no example of the materials is given here.

The protective film 16 protects the light incident surface of the disc section 3. The protective film 16 may be made of any material that is transparent, for example, resins such as polycarbonate, ABS, resins and the acrylate resin, glasses like the reinforced glasses. The resins have the advantage of suitability for mass production because the resins can be produced by the die-cast method, spin-coating or the like. Another advantage of the resins is their low material cost. The glasses are so advantaged because the glasses are excellent in flatness and hardness, and are optically stable. Moreover, it is preferable that the protective film 16 is made of a material having a slippery property (because a surface of the protective film 16 is in vicinity of the head 11), and an anti-static property for dustproof.

The head 11, as shown in FIG. 3, is provided with a magnetic coil (magnetic head section) 17, an objective lens 18, a mirror 19, an aberration compensation lens group 20, a half mirror 21, a light emitter 22, and a light receptor 23.

The light emitter 22, which is an element for emitting a laser beam, is provided with an LD (Laser Diode), for example. The light receptor 23 is an element for receiving a laser beam reflected from the recording film 15 so as to read a signal. The half mirror 21 is an optical part for allowing the laser beam emitted from the light emitter 22, and for reflecting, toward a direction of the light receptor 23, a laser beam reflected from the disc section 3, on the contrary. The aberration compensation lens group 20 is a lens group for compensating aberration of the laser beam emitted by the light emitter 22. The mirror 19 reflects, toward a direction of a light illuminating point of the disc section 3, the laser beam emitted from the light emitter 22. The objective lens 18 is a lens for converging the laser beam reflected by the mirror 19 so as to focus the laser beam onto the recording film 15 of the disc section 3. The objective lens 18, mirror 19, aberration compensation lens group 20, half mirror 21, light emitter 22, and light receptor 23 constitute an optical head section of the head 11. The magnetic coil 17 applies a magnetic field onto the recording film 15 of the disc section 3, so that the recording is performed.

Note that the above example discusses the disc for recording/reproducing, whose recording film 15, as the recording layer, is made of the recording film material suitable for the phase change recording and the optical magnetic recording. However, the present invention is not limited to this. For example, the present invention may use (a) a read-only disc like CD, CD-ROM, and DVD-ROM, which has, as a recording layer, a reflection film on an irregular part of the substrate, which is formed beforehand in accordance with information, or (b) a rewritable disc such as DC-R and DVD-R. Moreover, the above example uses, as the head 11, the head for recording/reproducing. However, the present invention is not limited to this. The present invention may use a head only for reproducing with respect to the disc for recording/reproducing and the read-only disc. In this case, the magnetic coil 17 and the like member are unnecessary.

The head 11 having the above arrangement carries out the reproducing operation, in other words, projecting the laser beam and detecting reflected light, as follows. To begin with the laser beam emitted from the light emitter 22 is directed to the aberration compensation lens group 20 through the half mirror 21, so as to compensate the aberration of the laser beam by the aberration compensation lens group 20. Then, the laser beam is directed to the objective lens 18 by the mirror 19 that reflects the laser beam compensated as such. The objective lens 18 converges the laser beam, so as to focus the laser beam on the recording film 15 after passing through the protective film 16 of the disc section 3. Thereafter, the reflected light, whose reflected light amount is changed in accordance with data stored in the recording film 15, passes through the objective lens 18, then, is reflected by the mirror 19 to the aberration compensation lens group 20. Passing through the aberration compensation lens group 20, the reflected light reaches the half mirror 21. After that, the half mirror 21 reflects the reflected light to a direction of the light receptor 23. Then, the light receptor 23 receives the reflected light so as to read the data.

In the following, a conventional optical disc is explained. The conventional optical disc is so arranged that the laser beam for recording/reproducing is directed to a recording surface through a disc substrate made of polycarbonate or the like, which is transparent. In short, the conventional optical disc is provided with the disc substrate that has a recording film on an opposite side to a light incident surface, on the contrary to the above-mentioned arrangement of the disc 1. The reason why the conventional optical disc has the recording film on the opposite side with respect to the light incident surface is that the laser beam to be directed on the recording film is focused on the recording film after passing perpendicularly through the disc substrate, in order to limit an adverse effect given by dust and damage, in case the dust is attached or the damage is caused on the light incident surface of the disc substrate.

However, in case the laser beam passing through the disc substrate perpendicularly is directed onto the recording surface, a focal point distance is lengthened as much as a thickness of the disc substrate. This requires the objective lens to have a larger diameter. Moreover, because the laser beam to be directed to the objective lens needs to have a large diameter, a large mirror is required, so that the laser beam, which is directed from a light emitter, is reflected toward a direction of the objective lens. Specifically, the disc substrate has a thickness ranging from 0.6 to 1.2 mm, a distance between a head and a surface of the disc substrate is about 1 mm, and the laser beam has a diameter of about 1 mm. For these reasons, the conventional optical disc has a head that is a comparatively large in size and weight. This makes a disc drive thicker, while slowing an access speed of the head.

Compared with the time when the conventional optical disc was developed, use of a digital recording signal and an advanced error correction technology have improved an error tolerance property of the optical disc currently used. More specifically, because the dust and damage on the surface of the disc substrate cause less error than before, passing the laser beam through the disc substrate so as to direct the laser beam onto the recording film is no more necessary.

For these reasons, the disc 1 of the present embodiment has the recording film 15 on the light incident surface of the disc substrate 14, thereby having a shorter focal point distance of the laser beam. This also gives the head 11 a smaller size and a lighter weight, compared with the conventional head. Specifically, because the laser beam can have a diameter as small as 10 μm, the diameter of the objective lens and the size of the mirror can be about 100 times smaller than those provided in the conventional head. This realizes a significantly miniaturized head. Thus, it is possible to realize a thinner disc drive and a higher head access speed.

Figure 4:
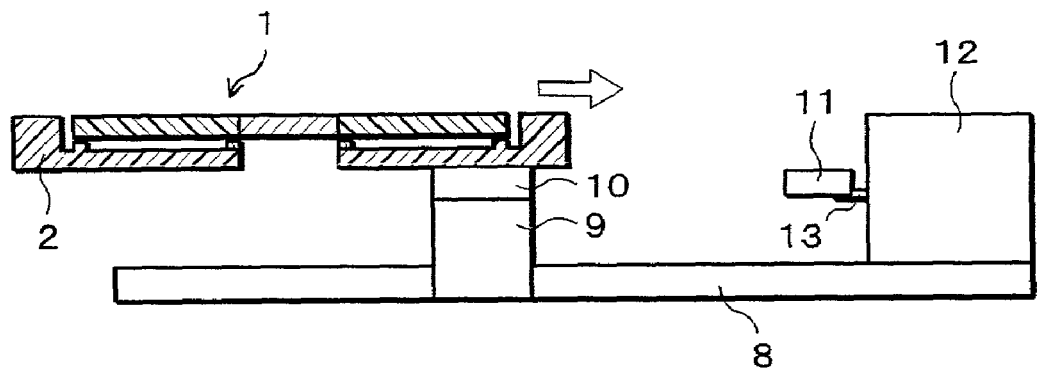
FIGS. 4(a) to 4(d) are explanatory views illustrating how a disc drive of the embodiment of the present embodiment records/reproduces with respect to the disc cartridge.
Figure 4:
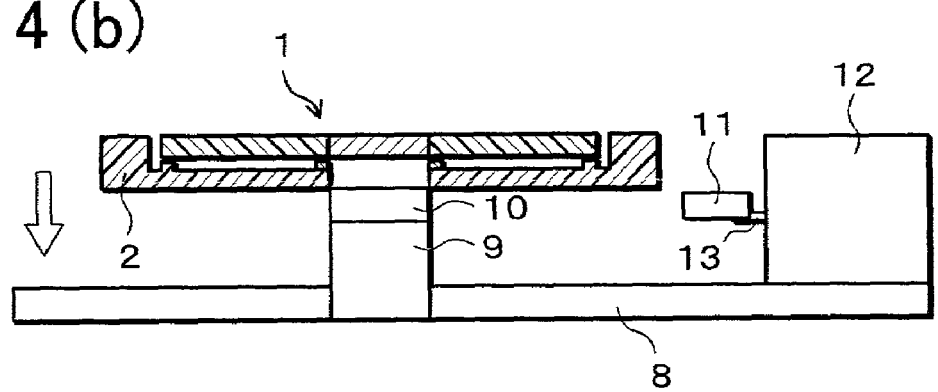
Figure 4:
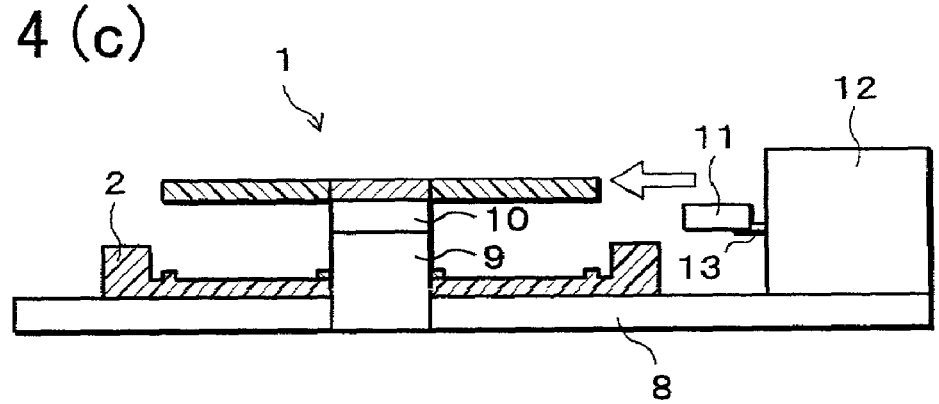
Figure 4:
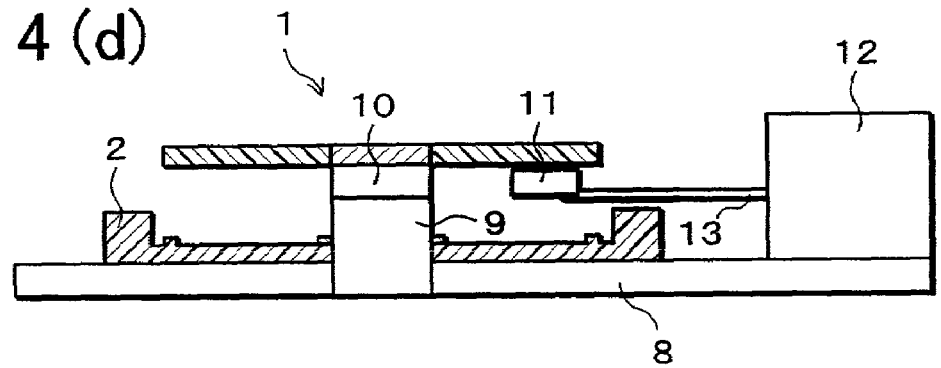

Next, a disc drive for recording/reproducing with respect to the disc cartridge is explained. FIGS. 4(*a*) through 4(*d*) are explanatory views illustrating how the disc drive records/reproduces with respect to the disc cartridge. The disc drive, as shown in FIG. 4(*a*), is provided with a base section 8, a spindle motor 9, a chucking 10, the head 11, an actuator 12 and a head arm 13.

The base section 8 is a base member for supporting each member of the disc drive. The spindle motor 9 is a motor for rotating the disc 1 of the disc cartridge during the recording/reproduction. The chucking 10 holds the disc 1 during the recording/reproduction, and during a wait time for the recording/reproduction. The chucking 10, provided on a top surface of the spindle motor 9, is rotated in accordance with the rotation of the spindle motor 9. Thus, the rotation of the spindle motor 9 rotates the disc 1 supported by the chucking 10.

The head 11 is provided with (a) an optical head for projecting the laser beam onto the disc 1 and for detecting the reflected light from the disc 1, during the recording/reproduction, and (b) a magnetic head for generating a magnetic field during the recording. The actuator 12 moves the head 11, which is in a shunting position, to a region of the disc 1 to be subjected to the recording/reproduction, while controlling access of the head 11 to a desired position in the disc 1 (desired disc position). The head arm 13 supports the head 11 and moves the heat 11 in accordance with the control by the actuator 12.

The following explains how the disc drive operates, from insertion of the disc cartridge to the recording/reproduction. To begin with, as shown in FIG. 4(*a*), the disc drive, in which the disc 1 and the disc cover 2 are put together, is inserted into the disc drive sidewardly from its side above the chucking 10, over the chucking 10. Then, as shown in FIG. 4(*b*), the sideward movement of the disc cartridge is stopped when the opening section of the disc cover 2 comes right above the chucking 10.

Thereafter, the disc cover 2 is moved downward by disc cover elevation means (not shown) of the disc drive. At this time, the disc 1 is also moved downward as the disc cover 2 is moved downward. But the downward movement of the disc 1 is stopped when the hub section 4 of the disc 1 reaches the chucking 10. On the other hand, because the opening section of the disc cover 2 is larger than a diameter of the chucking 10, the disc 1 and disc cover 2 are separated from each other as the disc cover 2 is further moved downward by the disc cover elevation means. Then, as shown in FIG. 4(c), the disc cover 2 is moved downward until the disc cover 2 reaches the base section 8.

The separation of the disc 1 from the disc cover 2 makes a gap. As shown in FIG. 4(d), the head 11 is inserted into the gap by the actuator 12, so that the recording/reproduction is carried out in the desired disc position.

Figure 5:
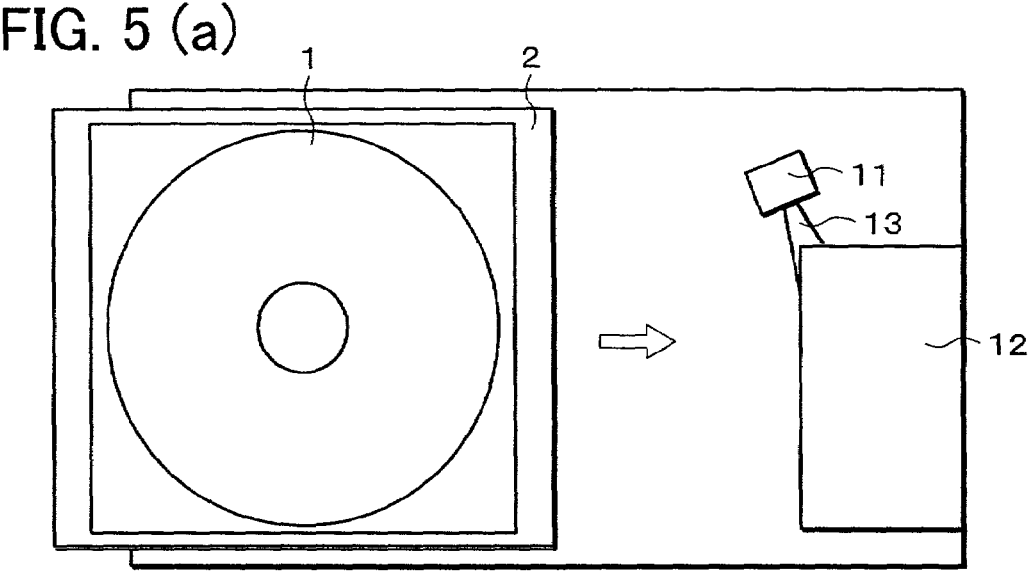
FIGS. 5(a) to 5(c) are explanatory views showing top views of the operation shown in FIGS. 4(a) to 4(d).
Figure 5:
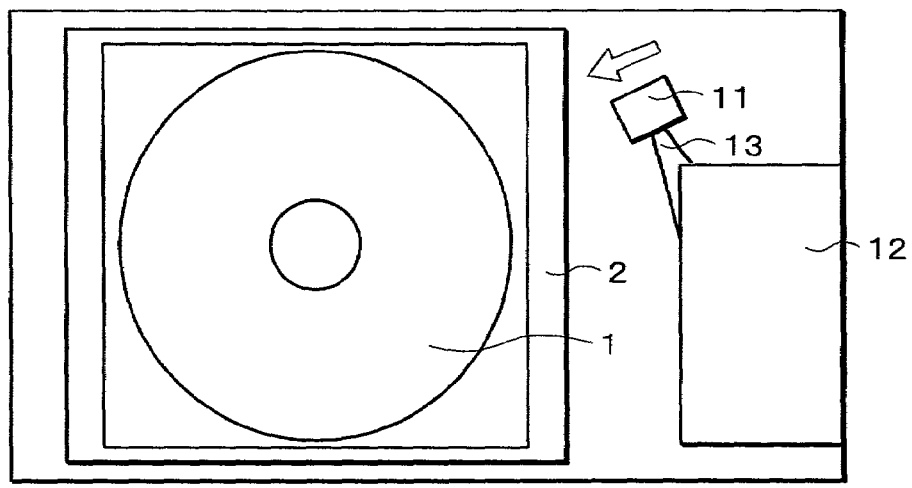
Figure 5:
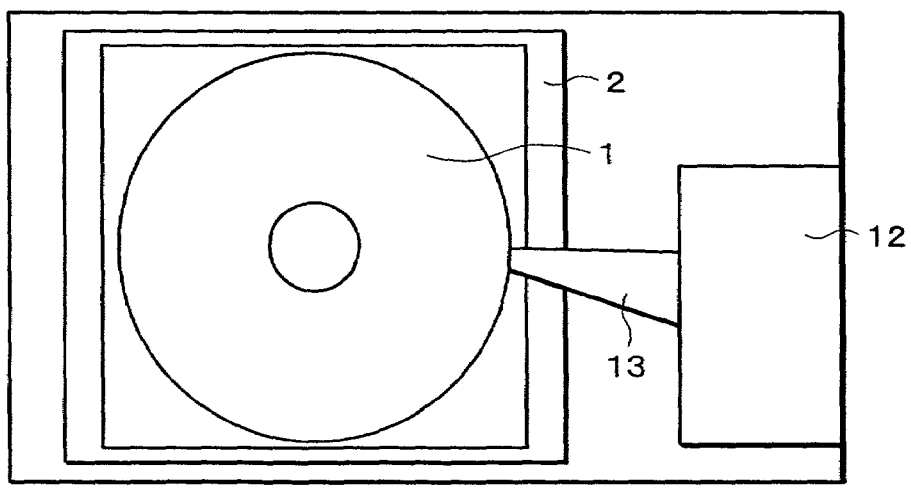

Note that FIGS. 5(a) to 5(c) illustrate top views of the above operations shown in FIGS. 4(a) through 4(d). Thus, FIG. 5(a) shows the state where the disc cartridge is inserted into the disc drive sidewardly from its side, while FIG. 5(b) illustrates the state where the separation between the disc 1 and the disc cover 2 is completed. And FIG. 5(c) shows the state where the head 11 is moved to the position for recording/reproducing.

As shown in those figures, the head arm 13 is moved in a circular motion with respect to its fulcrum provided inside the actuator 12, so as to move the head 11. With this arrangement where the head 11 is moved by swinging the head arm 13, it is possible to move the head 11 within a comparatively small space in the disc drive. As a comparative example, discussed here is an arrangement in which the head arm 13 is slid sidewardly. In this case, the head arm 13 is extended sidewardly when the head 11 is in the shunting position, as much as a length of the head arm 13 required to be able to reach a farthest position from the actuator 12. On the contrary, the disc drive shown in FIGS. 4(a) to 4(d), can be small with respect to a lateral direction.

Moreover, in the disc drive shown in FIGS. 4(a) through 4(d), the actuator 12 is located outside the area where the disc cartridge is loaded, and the head 11 is inserted sidewardly between the disc 1 and the disc cover 2. Therefore, the disc drive may be so thin that the thickness of the disc drive is just enough for parting the disc 1 and the disc cover 2 so much as the head 11 can be inserted therein. This, it is possible to give the disc drive a very thin thickness.

Furthermore, the disc drive inserts the head 11 sidewardly when the disc cover 2 is separated from the disc 1. In short, the head 11 is moved only horizontally. Thus, compared with an arrangement in which the head 11 need be moved vertically, for example, it is possible to simplify the control of the movement of the head 11 by the actuator 12.

In the following, explained is a system for locking the disc 1 and the disc cover 2 in the disc cartridge. The disc cartridge shown in FIG. 1 has the arrangement where the disc 1 and the disc cover 2 are put together by means of the magnetic force between the magnetic material of the hub section 4 of the disc 1 and that of the inner disc touching section 5 of the disc cover 2. With this arrangement, the disc 1 and the disc cover 2 can be separated comparatively easily. Thus, there is possibility that the light incident surface of the disc 1 cannot be protected appropriately. Therefore, it may be so arranged as follows that the disc 1 and the disc cover 2 are locked to be together.

Figure 6:
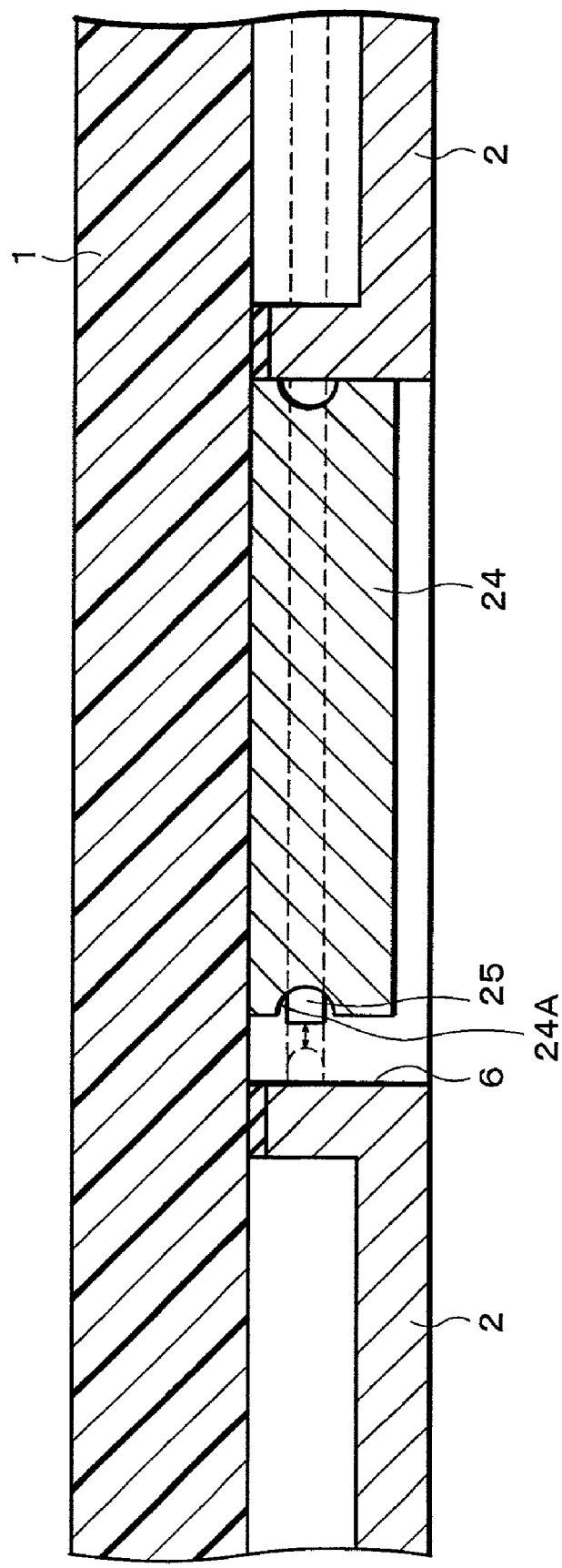
FIG. 6 is a cross-sectional view showing in magnification a vicinity of a central part of the disc cartridge where a lock system is located.

FIG. 6 is a cross-sectional view illustrating in magnification a vicinity of a central part of a disc cartridge having a lock system. As shown in FIG. 6, a disc projected section 24 is provided in a central part of that surface of the disc 1 that faces the disc cover 2. The disc projected section 24 has a circular shape, which is concentric with the disc 1 in a bottom view of FIG. 6. The disc projected section 24 has a diameter slightly smaller than that of the opening section 6 of the disc cover 2 so that the disc projected section 24 can be inserted within the opening section 6 when the disc 1 and the disc cover 2 are put together.

Moreover, a recessed section 24A is provided on a side surface of the disc projected section 24, in other words, its surface that is vertical with respect to the disc 1 and faces the opening section 6. Meanwhile, a projecting section 25 is provided on the disc cover 2, in such a manner that the projecting section 25 can be moved sidewardly, that is, in a direction parallel with respect to the surface of the disc 1.

The projecting section 25 is positioned to touch the opening section 6 of the disc cover 2, when the disc 1 and the disc cover 2 are disassembled, as indicated by broken lines in FIG. 6. When the disc 1 and the disc cover 2 are locked together, the projecting section 25 is moved in a central direction to go into the recessed section 24A of the disc projected section 24. Further, as the recessed section 24A is moved toward the central direction, the disc projected section 24 is also moved sidewardly in accordance with the movement of the recessed section 24A, so that the opening section 6 of the disc cover 2 is touched by a part of the side surface opposite to a part of the side surface touched by the projecting section 25. In this state, the disc 1 cannot be separated from the disc cover 2 because the projecting section 25 is hooked in the recessed section 24A, thereby locking the disc 1 and the disc cover 2 together.

It should be noted that the recessed section 24A may be formed wholly around the side surface of the disc projected section 24, that is, around the wholly around a column shape of the disc projected section 24, alternatively may be formed only on a part of the side surface of the disc projected section 24. Moreover, in case the recessed section 24A is formed wholly around the column shape, the projecting section 25 may be so shaped as to encircle with respect with the whole recessed section 24A, for example, shaped in a circle. Alternatively, the projecting section 25 may be so shaped that the projecting section 25 is projected within a part of the recessed section 24A. Further, it may be so arranged that a plurality of the projecting sections 25 are provided in plural positions around the disc projected section 24 so as to lock the disc 1 and the disc cover 2 together by moving the projecting sections 25 into the recessed section 24A.

Moreover, shown in FIGS. 7(a) and 7(b) is another possible arrangement of a lock system, other than the lock system shown in FIG. 6. FIG. 7(b) is a plan view of the disc cartridge observed from above, that is, from a side where the disc 1 is, while FIG. 7(a) is a cross-sectional view taken on line a–a' of FIG. 7(b).

As shown in those figures, the disc cover 2 is provided with disc holding locks 26 on its top surface. The disc holding locks 26 lock the disc 1 by holding its outer circumference. The disc holding locks 26 are located respectively near two angles on a diagonal line of the disc cover 2, which is square in shape. And each disc holding lock 26 can be rotated arbitrarily with respect to a shaft 26A so that the disc 1 can be locked or unlocked in a switching manner, depending on its rotation angle.

When the disc 1 is locked, both the disc holding locks 26 are so positioned to have such a rotation angle at which a tip part of each disc holding lock 26 overlaps the top surface of the disc 1 in the outer circumference part thereof. In this manner, the disc 1 is supported in such a manner that the disc 1 is sandwiched by the outer disc touching section 7, which holds the bottom of the disc 1, and the disc holding locks 26, which hold the top of the disc 1. The outer disc touching section 7 and the disc holding locks 26 hold two points of the outer circumference part of the disc 1 that are on a line including the center of the disc 1. In this way, therefore, the disc 1 cannot be separated from the disc cover 2 in an upward direction.

On the other hand, when the disc 1 is unlocked, both the disc holding locks 26 are so positioned to have such a rotation angle that their tip parts do not overlap on the top surface of the outer circumference part of the disc 1. In this manner, there is nothing to stop the disc 1 from moving upward, thereby allowing the disc 1 and the disc cover 2 to separate from each other.

Examples of a switching system of the rotation angle of the disc holding locks 26 include the following arrangement. In the arrangement, the disc holding lock 26 is provided with a projecting section 27, while the disc cover 2 is provided with a guide ditch 28 on its side wall. When the disc holding lock 26 is positioned to lock, the projecting section 27 is projected within the guide ditch 28. On the other hand, when the disc holding lock 26 is positioned to unlock, the projecting section 27 is recessed beyond a bottom of the guide ditch 28.

With this arrangement, for example in case the disc cartridge is out of the disc drive, the disc holding lock 26 is position to lock, so that the projecting section 27 is projected within the guide ditch 28. Because the projection of the projecting section 27 is performed within the guide ditch 28, it is difficult to touch the projecting section 27 from an outside of the guide ditch 28, thereby maintaining the disc holding lock 26 in the position to lock.

On the other hand, when the disc cartridge is inserted in the disc drive, the projecting section 27 is pushed by a projected section of the disc drive that moves along the guide ditch 28 as the disc cartridge is inserted in. In this way, the insertion of the disc cartridge into the disc drive unlocks the disc holding lock 26.

Figure 7:
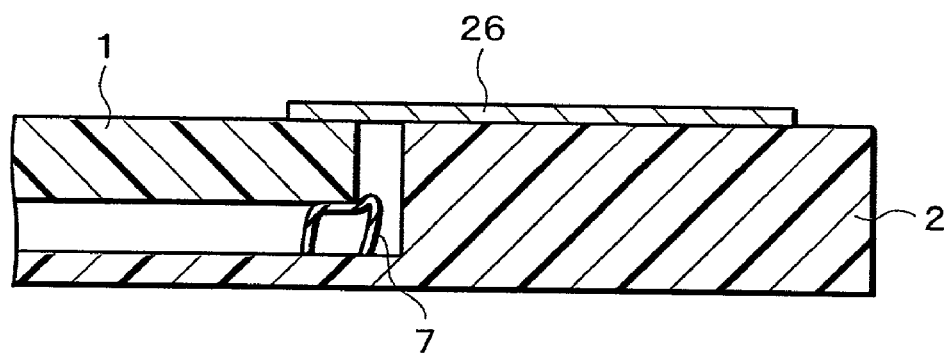
FIGS. 7(a) and 7(b) show another lock system, different from the lock system shown in FIG. 6.
Figure 7:
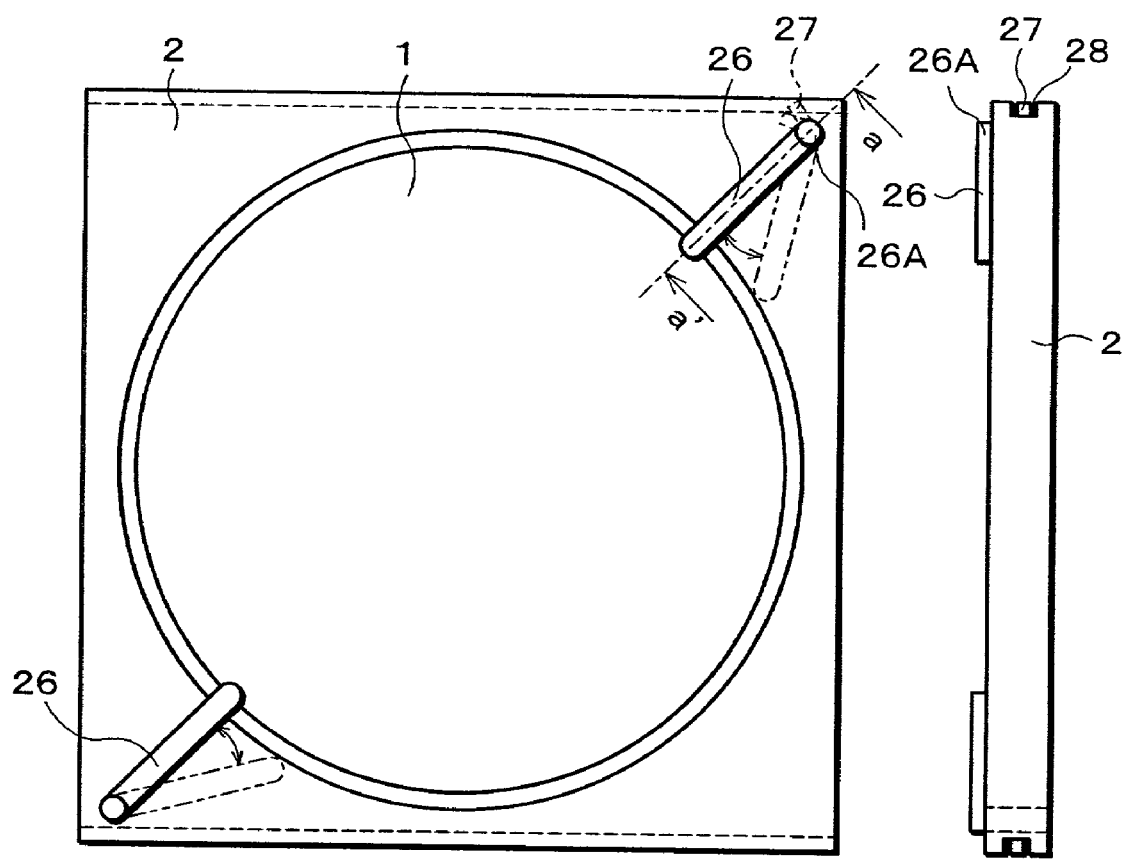

In addition, while the arrangement shown in FIG. 7(*b*) has the two disc holding locks 26 at two points on the top side of the disc cover 2, the present invention is not limited to this arrangement, and may be provided with more than two of the disc holding locks 26 to hold more than two points, or may be so arranged that the disc 1 is locked by only single disc holding lock 26 to hold only one point.

Figure 8:
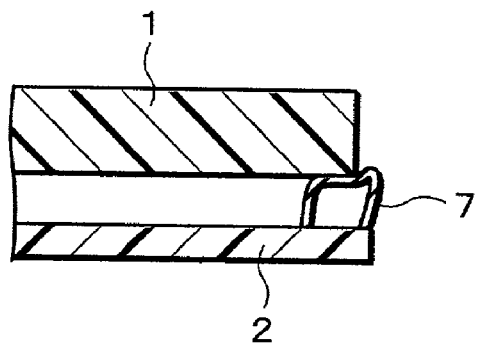
FIGS. 8(a) and 8(b) illustrate a specific example of a shape of a disc cartridge.
Figure 8:
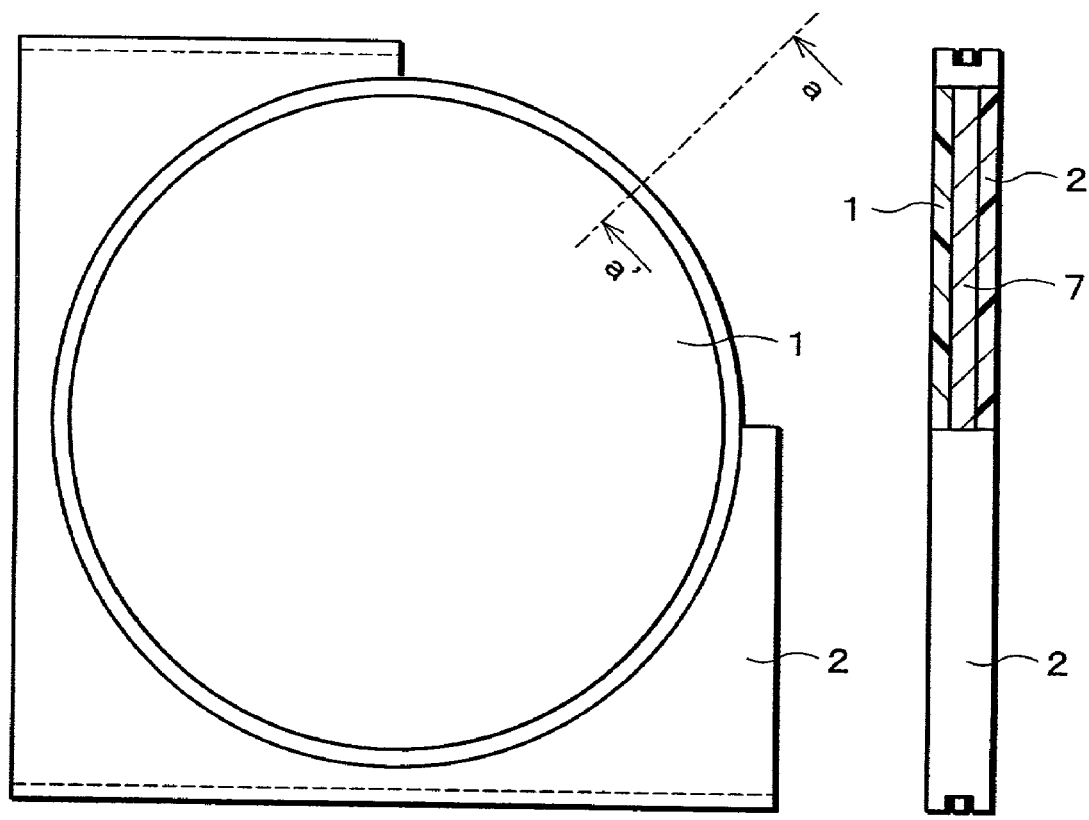

Next, a shape of the disc cartridge is explained with a concrete example. FIGS. 8(*a*) and 8(*b*) illustrate the concrete example of the shape of the disc cartridge. FIG. 8(*b*) is a top view of the disc cartridge, that is, a plan view of the disc cartridge observed from the side where the disc 1 is located, whereas FIG. 8(*a*) is a cross-sectional view taken on line a–a' of FIG. 8(*b*).

The disc cartridge shown in FIGS. 8(*a*) and 8(*b*) has such a disc cover 2 that is in an incomplete square shape (a square shape missing a part). More specifically, the disc cover 2 has such a shape that an outskirts area with respect to the disc 1 is missing in one region out of four regions into which the disc cover 2 is divided by lines crossing the center thereof. In this region, as shown in FIG. 8(*a*), there is no side wall of the disc cover 2, so that the outer circumference part of the disc 1 is exposed externally.

The disc drive for recording/reproducing with respect to the disc cartridge having this arrangement is so arranged that the head is inserted in the region missing the side wall of the disc cover 2. In this way, it is possible to reduce an amount of the downward elevation (movement) of the disc cover 2 in the operation of the disc drive, which was explained with reference to FIGS. 4(*a*) and 4(*b*). This is because the insertion of the head 11 is carried out in the region missing the side wall of the disc cover 2, so that the insertion of the head 11 requires a smaller gap between the disc 1 and the disc cover 2.

The above is explained here in detail. In the arrangement where the side wall of the disc cover 2 exists in the region where the head 11 is inserted, the insertion of the head 11 requires the gap equivalent to a distance between a bottom surface of the disc 1 and a top surface of the side wall of the disc cover 2. On the contrary, in case the disc cartridge shown in FIGS. 8(*a*) and 8(*b*) is used, the insertion of the head 11 requires a gap equivalent to a distance between the bottom surface of the disc 1 and a top part of the outer disc touching section 7 provided in the disc cover 2. As shown in FIGS. 4(*a*) and 4(*b*), the side wall of the disc cover 2 is higher than a height of the outer disc touching section 7. Therefore, the use of the disc cartridge shown in FIGS. 8(*a*) and 8(*b*) can reduce the amount of the downward elevation of the disc cover 2. Thus, it is possible to reduce a thickness (a vertical height) of the disc drive (that is, the disc drive may be thinner).

Figure 9:
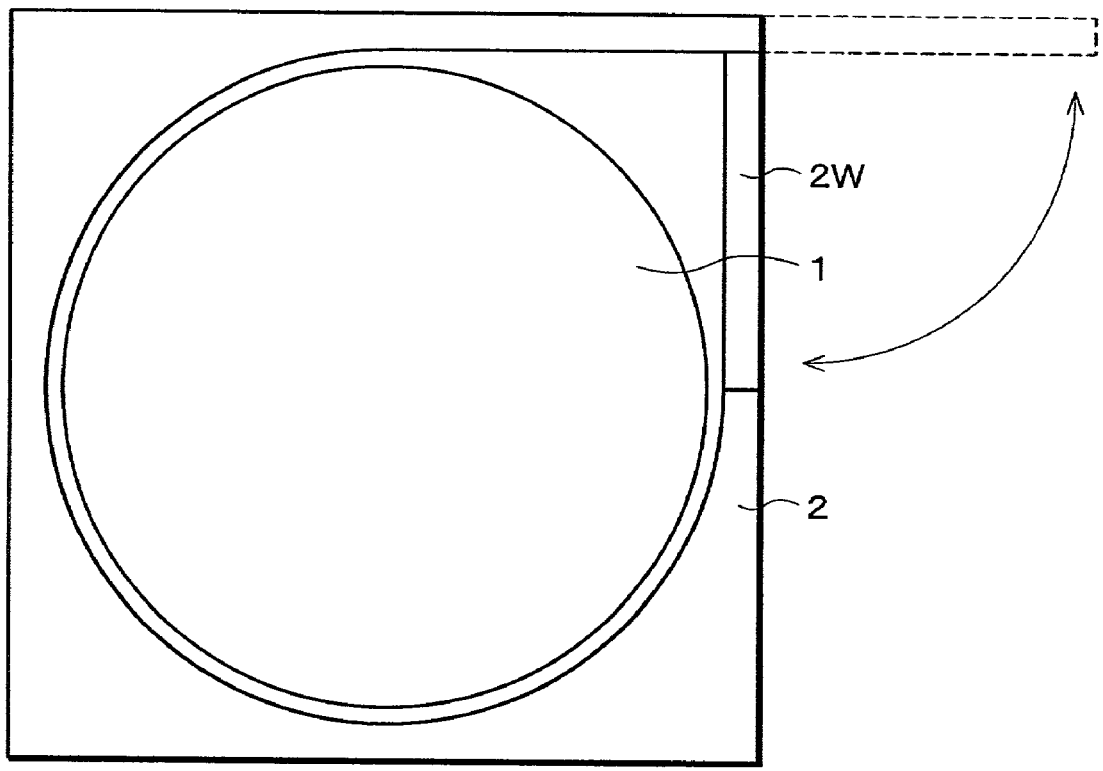
FIG. 9 is a plan view of another specific example of a shape of a disc cartridge.

Moreover, a disc cartridge shown in FIG. 9 is still another possible disc cartridge, besides the disc cartridge shown in FIGS. 8(*a*) and 8(*b*). The disc cartridge shown in FIG. 9 is so arranged that a part of the side wall of the disc cover 2 can be opened and closed. In other words, the disc cover 2 is provided with a side wall section 2W that can be externally opened and closed.

In case of the above disc cartridge, the side wall section 2W is closed when the disc cartridge is outside the disc drive, whereas the side wall section 2W is opened when the disc cartridge is inserted into the disc drive. Similarly to the previous case, this reduces the amount of the downward elevation of the disc cover 2, which is necessary for the insertion of the head. Thus, the disc drive can be thinner. Moreover, because the side wall section 2W is closed when the disc cartridge is outside of the disc drive, the disc cartridge has a structure strong against an impact applied sidewardly.

[Second Embodiment]

Described below is another embodiment of the present invention, with reference to figures. Note that members having identical functions as those explained in the first embodiment are labelled in the same manner, and explanation of them is omitted here.

To begin with, a disc cartridge of the present embodiment is explained. The disc cartridge of the first embodiment is so arranged that the disc 1 and the disc cover 2 are detached so as to allow the head to be inserted therebetween, when the disc cartridge is subjected to the recording/reproduction in the disc drive. On the contrary, the disc cartridge of the present embodiment is provided with a disc cover 2 that has a shutter so that a head accesses to a disc 1 when the shutter is opened.

FIGS. 10(*a*) and 10(*b*) are perspective views of the disc cartridge observed from above, whereas FIGS. 11(*a*) and 11(*b*) are perspective views of the disc cartridge observed from underneath. Note that FIGS. 10(*a*) and 11(*a*) illustrate the disc cartridge with a shutter 30 closed, while FIGS. 10(*b*) and 11(*b*) show the disc cartridge with the shutter 30 opened. As shown in those figures, the disc cover 2 is provided with the shutter 30. Moving the shutter 30 sidewardly (an in-plane direction of the disc cover 2) switches over whether the disc 1 is exposed or not exposed from a bottom surface of the disc cartridge. It should be noted that other parts of the arrangement are equivalent with those of the first embodiment shown in FIGS. 1(*a*) and 1(*b*). Thus, explanation of them is omitted here.

The shutter 30, as mentioned above, functioned to switch over whether the disc 1 is exposed or not exposed from the bottom surface of the disc cartridge, while the shutter 30 has another function to fix the disc 1 in the disc cover 2 when the disc cartridge is outside the disc drive. FIG. 12(*a*) is a plan view of the disc cartridge observed from underneath, with the shutter 30 closed, while FIG. 12(*b*) is a cross-sectional view taken on line a–a' of the FIG. 12(a). Note that, in FIG. 12(b), the disc cover 2 is on top and the disc 1 is at bottom, that is, the disc cover 2 is bottomed up, with respect to the previous explanation.

As shown in those figures, the disc 1 is provided with a hub 32 in a central part thereof. The hub 32 has a flange-like shape projected in a direction of the disc cover 2. Meanwhile, the shutter 30 is provided with a hub holding notched section 31, whose notch is opened to an opposite direction with respect to a direction in which the shutter 30 is moved to open. When the shutter 30 is closed, a flange section of the hub 32 is hooked and fixed in the hub holding notched section 31.

Figure 13:
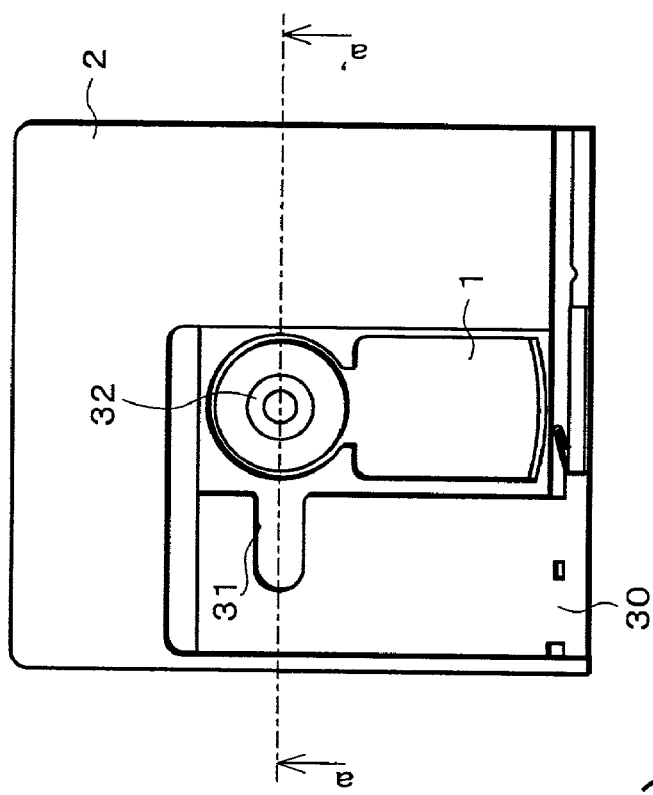
Figure 13:
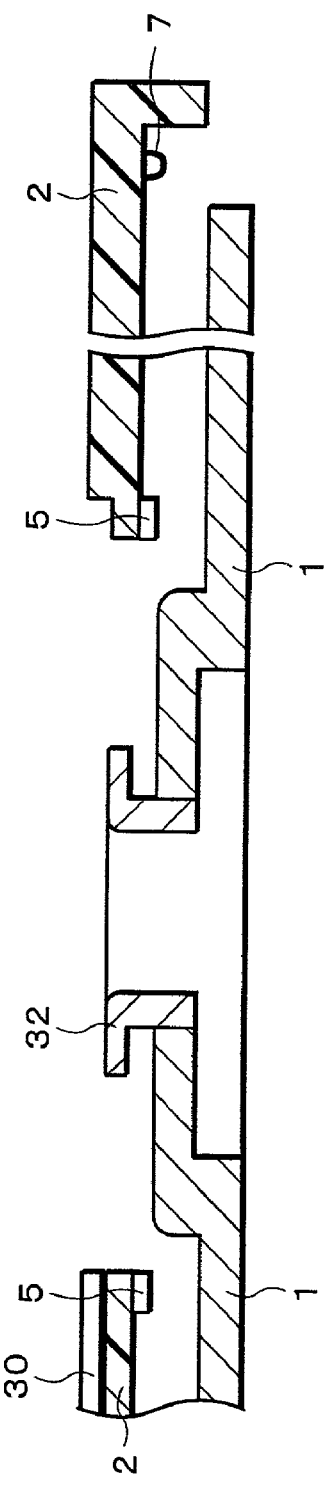

FIG. 13(a) is a plan view of the disc cartridge with the shutter 30 opened, observed from underneath, while FIG. 13(b) is a cross-sectional view taken on line a–a' of FIG. 13(a). Note that, similarly to the above, in FIG. 13(b), the disc cover 2 is on top while the disc 1 is at bottom, thus, the disc cartridge is bottomed up here, with respect to the previous explanation.

As shown in those figures, when the shutter 30 is moved leftwardly and is opened, the flange section of the hub 32 is released from the hub holding notched section 31. This unfixes the disc 1 from the disc cover 2.

Figure 14:
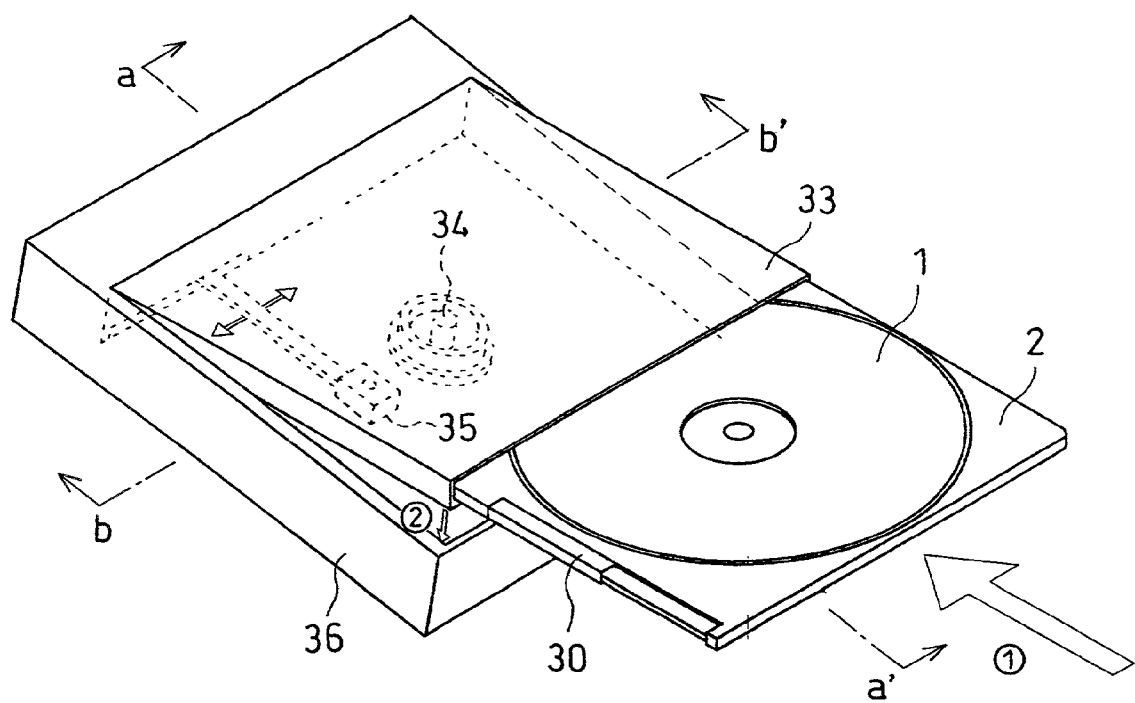
FIG. 14 is a perspective view illustrating a state where a disc cartridge is inserted into a disc drive of the another embodiment of the present invention.

Next, explained below is a disc drive for recording/reproducing with respect to the above-mentioned disc cartridge. FIG. 14 is a perspective view showing a state where the disc cartridge is inserted into the disc drive. As shown in FIG. 14, the disc drive is provided with a drive case 36 that is provided with a cartridge holder 33, a spindle motor 34, and a head 35. The spindle motor 34 is a motor for rotating the disc 1 during the recording/reproducing. The head 35 is a head for recording/reproducing. The head 35 is so located at a bottom of the drive case 36 as to be able to access to the disc 1 in a direction vertical to a direction in which the disc cartridge is inserted (loaded)/unloaded.

When the disc cartridge is inserted into the disc drive, the cartridge holder 33 is lifted up in a diagonal direction with respect to a top surface of the drive case 36, so as to expose an inlet of the disc cartridge that is provided on a side surface of the cartridge holder 33, so as to carry out the insertion.

Figure 15:
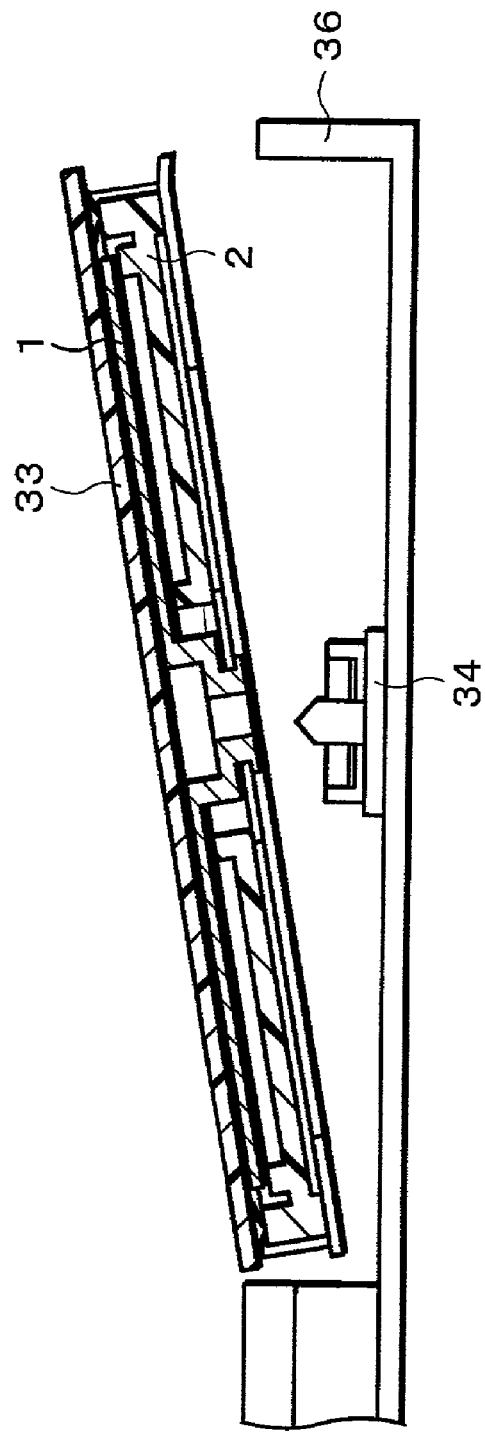
FIG. 15(a) a cross-sectional view taken on line a–a' of FIG. 14.
FIG. 15(b) is a cross-sectional view taken on line a–a' of FIG. 14, illustrating that loading the disc cartridge is completed.
Figure 15:
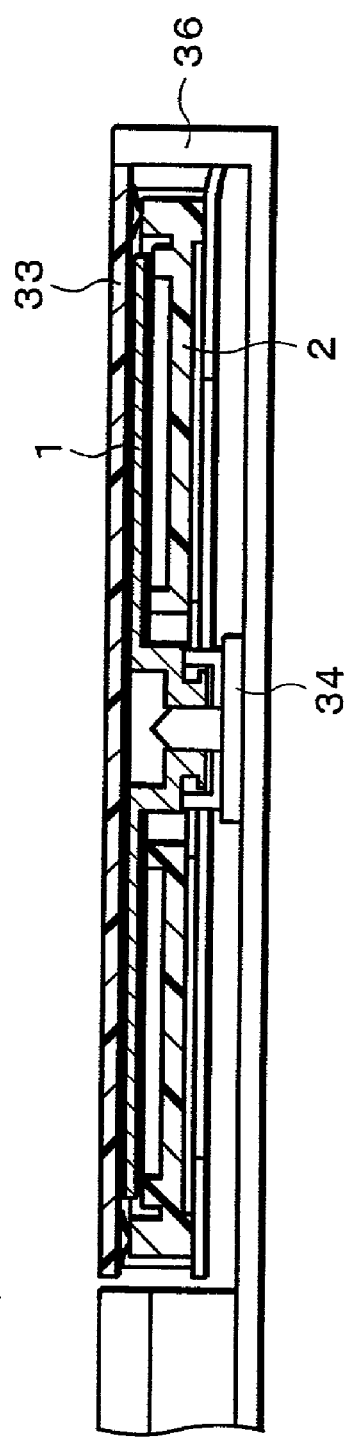

Thereafter, the disc cartridge is pushed in a direction indicated by an arrow ① in FIG. 14. After the disc cartridge reaches an inmost part of the cartridge holder 33, the cartridge holder 33 is pushed down into the drive case 36 in a direction indicated by an arrow ② in FIG. 14, thereby completing the loading of the disc cartridge. FIG. 15(a) is a cross-sectional view taken on line a–a' of FIG. 14 illustrating a state where the disc cartridge reaches the inmost part of the cartridge holder 33. Meanwhile, FIG. 15(b) is a cross-sectional view taken on line a–a' of FIG. 14, showing a state where the loading of the disc cartridge is completed.

Figure 16:
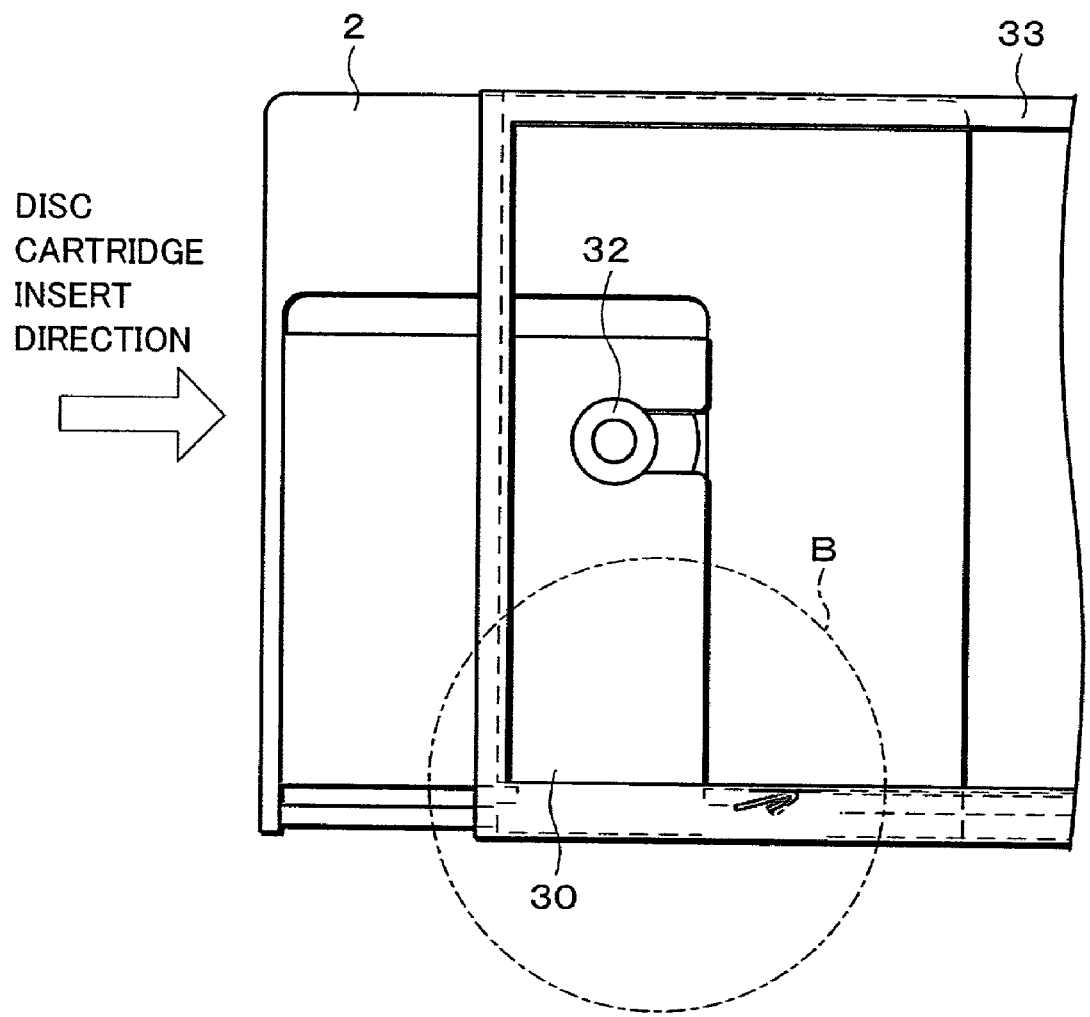
FIG. 16 is an explanatory view illustrating a state where the shutter is about to be opened after the insertion of the disc cartridge into the cartridge holder.
Figure 17:
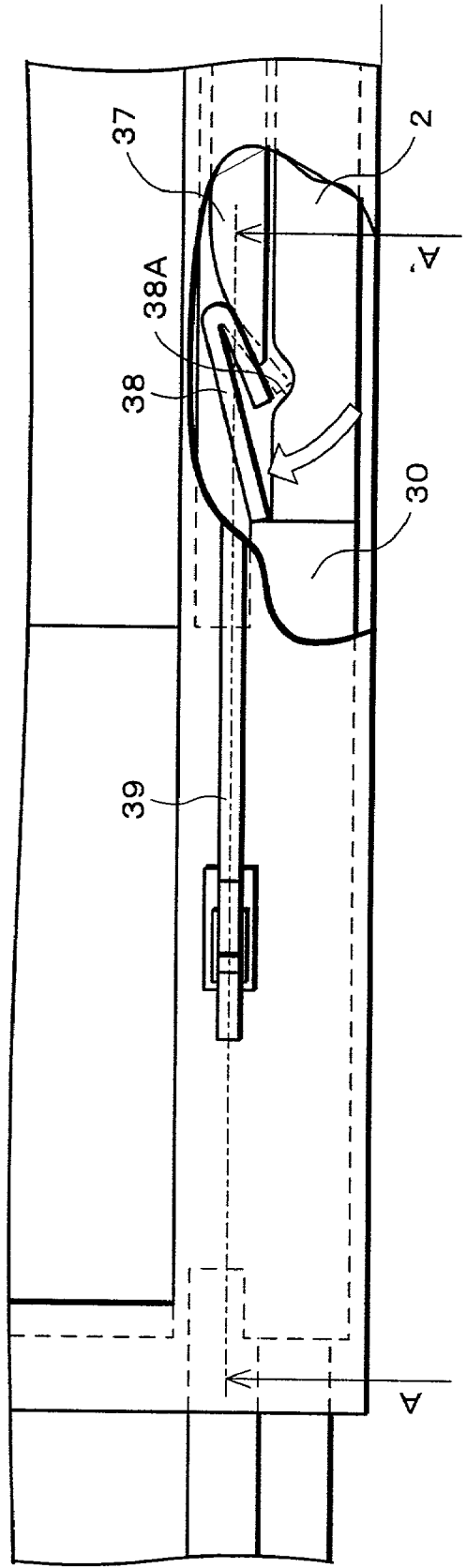
Figure 17:
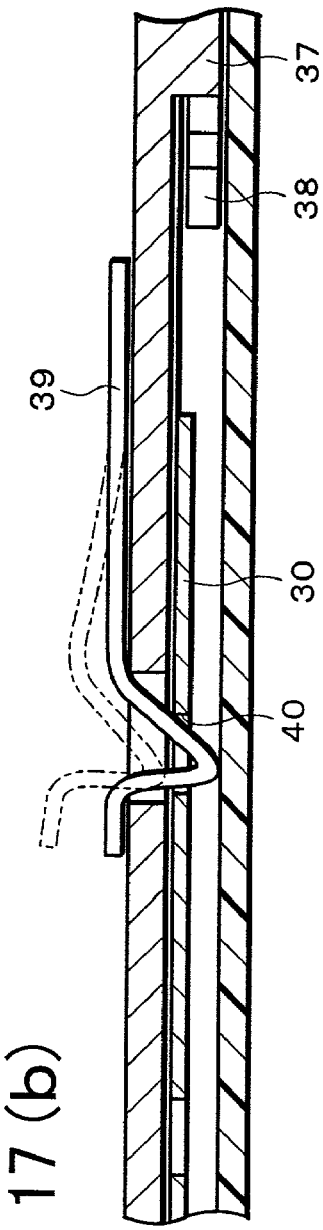

The following discusses an arrangement for opening the shutter 30 when the disc cartridge is inserted into the cartridge holder 33. FIG. 16 is an explanatory view showing a state where the shutter 30 is about to be opened after the insertion of the disc cartridge into the cartridge holder 33. In FIG. 16, the disc cartridge is inserted from left to right. In FIG. 16, a system for opening/closing the shutter 30 is located within a region indicated by a reference mark B. FIG. 17(a) is an explanatory view illustrating in magnification the region indicated by the reference mark B, while FIG. 17(b) is a cross-sectional view taken on line A–A' of FIG. 17(a).

As shown in FIG. 17(a), the shutter 30 is provided with a shutter lock 38. When the shutter 30 is closed, the shutter lock 38 is hooked and stopped by a shutter lock hooking section 38A that is provided on the disc cover 2. Here, the insertion of the disc cartridge into the cartridge holder 33 makes a shutter unlocking bar 37 of the cartridge holder 33 touch the shutter lock 38 so as to unhook the shutter lock 38 from the shutter lock hooking section 38A. This unlocks the locking system for keeping the shutter 30 closed.

Moreover, as shown in FIG. 17(b), the cartridge holder 33 is provided with a shutter opening/closing bar 39. The shutter opening/closing bar 39 goes into a shutter opening/closing hole 40 provided on the shutter 30, almost at the same time when the shutter unlocking bar 37 unhooks the shutter lock 38.

Figure 18:
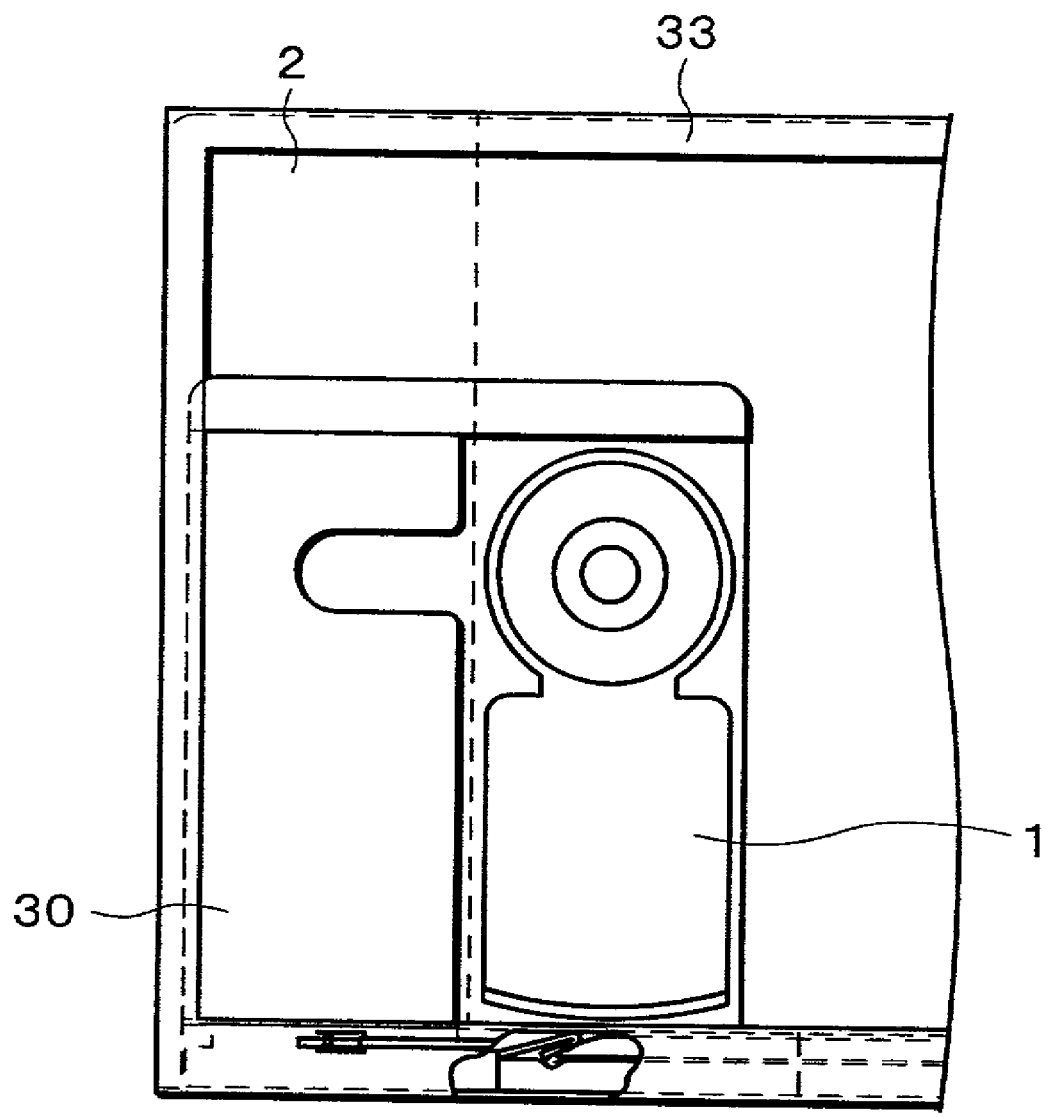
FIG. 18 is an explanatory view showing the disc cartridge and the cartridge holder when the shutter of the disc cartridge is fully opened.

Thereafter, as the disc cartridge is pushed further into the cartridge holder 33, the shutter opening/closing bar 39 pushes the shutter opening/closing hole 40 to open the shutter 30 more. Then, the shutter 30 is fully opened as shown in FIG. 18, when the disc cartridge reaches the inmost part of the cartridge holder 33.

Figure 19:
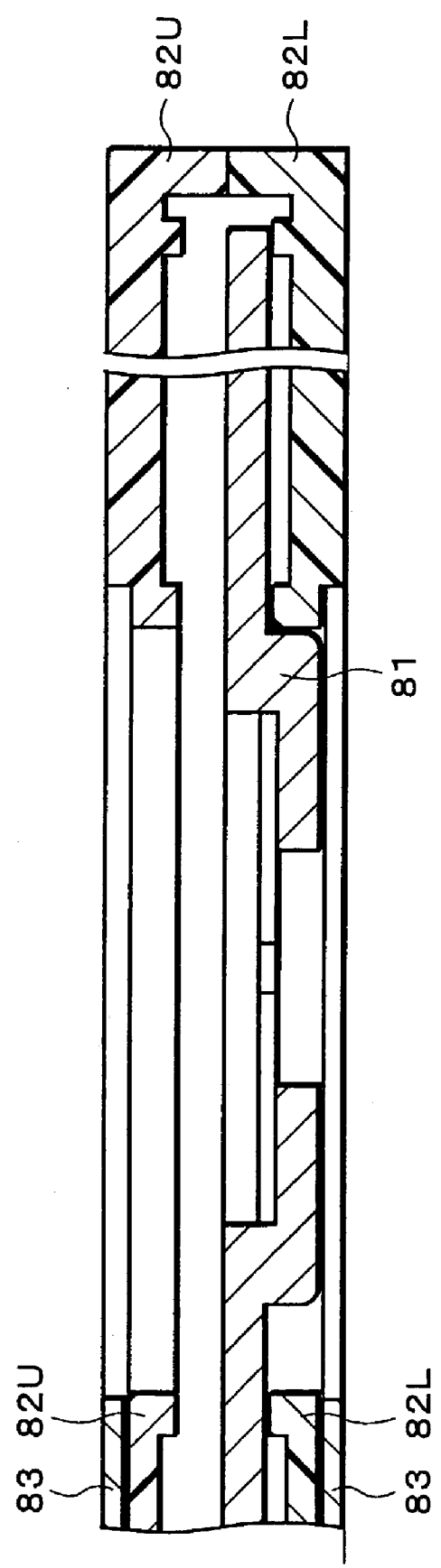
FIG. 19 is a cross-sectional view showing a schematic arrangement of a conventional disc cartridge.

Here, as a comparative example, a conventional disc cartridge and a corresponding conventional disc drive are explained. FIG. 19 is a cross-sectional view illustrating a schematic arrangement of the conventional disc cartridge. As shown in FIG. 19, the conventional cartridge is provided with a disc 81, an upper shell 82U, a lower shell 82L, a shutter 83, and the like. The disc 81 is provided with (a) a disc substrate made of a transparent material, (b) a recording film provided on an upper side (opposite to a light incident surface) of the disc substrate, and the like. Note that no illustration of the above arrangement is provided here. The disc 81 has a lower surface that is covered with the lower shell 82L, while an upper surface of the disc 81 is covered with the upper shell 82U. In short, the conventional disc cartridge is so arranged that the disc 81 is placed in a space surrounded by the upper shell 82U and the lower shell 82L.

FIGS. 20(a) and 20(b) are perspective views of a top view of the conventional disc cartridge, whereas FIGS. 21(a) and 21(b) are perspective views of a bottom view of the conventional disc cartridge. Note that the FIGS. 20(a) and 21(a) illustrate the conventional disc cartridge with the shutter 83 opened, while the FIG. 20(b) and FIG. 21(b) show the conventional disc cartridge with the shutter 83 closed. As shown in those figures, the shutter 83 is extended into both a top and a bottom surfaces of the disc cartridge. Sideward movement of the shutter 83 (in an in-plane direction of the disc cartridge) switches over whether the disc 81 is exposed or unexposed from the top and bottom surfaces of the disc cartridge.

Here, the disc cartridge of the first embodiment shown in FIG. 1(a) and the conventional disc cartridge shown in FIG. 19 are compared. The comparison shows that the disc cartridge of the first embodiment is thinner than the conventional one, due to the reduction in a thickness by the lack of the disc cover on the top surface of the disc 1 in the disc cartridge of the first embodiment. In other words, the disc cartridge of the first embodiment is easy to carry with and saves a space for storage, because of the thinner thickness thereof.

Figure 22:
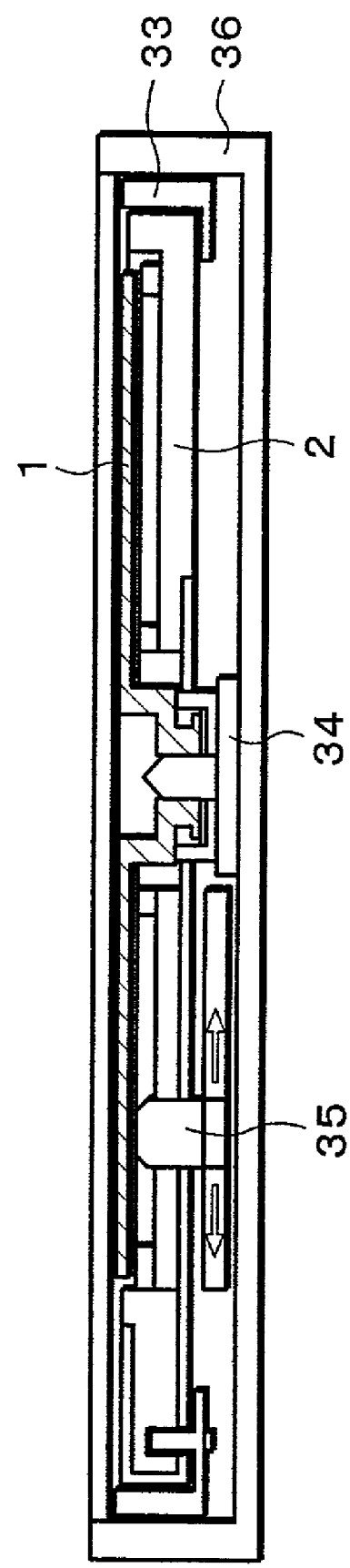
FIG. 22 is a cross-sectional view of the disc drive shown in FIG. 14, taken on line b–b' of FIG. 14.

Next, the disc drive for using the disc cartridge of the present embodiment is compared with the disc drive for using the conventional disc cartridge. FIG. 22 is a cross-sectional view of the disc drive of the present embodiment shown in FIG. 14, taken on line b–b' of FIG. 14. Meanwhile, FIG. 23 is a cross-sectional view of the disc drive for the conventional disc cartridge shown in FIG. 19.

The head 35 of the disc drive of the present embodiment is arranged in an identical manner with the head 11, which is explained with reference to FIG. 3 in the first embodiment.

Thus, the head 35 is provided with (a) a magnetic head for applying the magnetic field and (b) an optical head for projecting and detecting the laser beam. In short, the present disc drive has the head 35 by which only the lower part of the disc 1 is subjected to the recording/reproduction operation.

Figure 23:
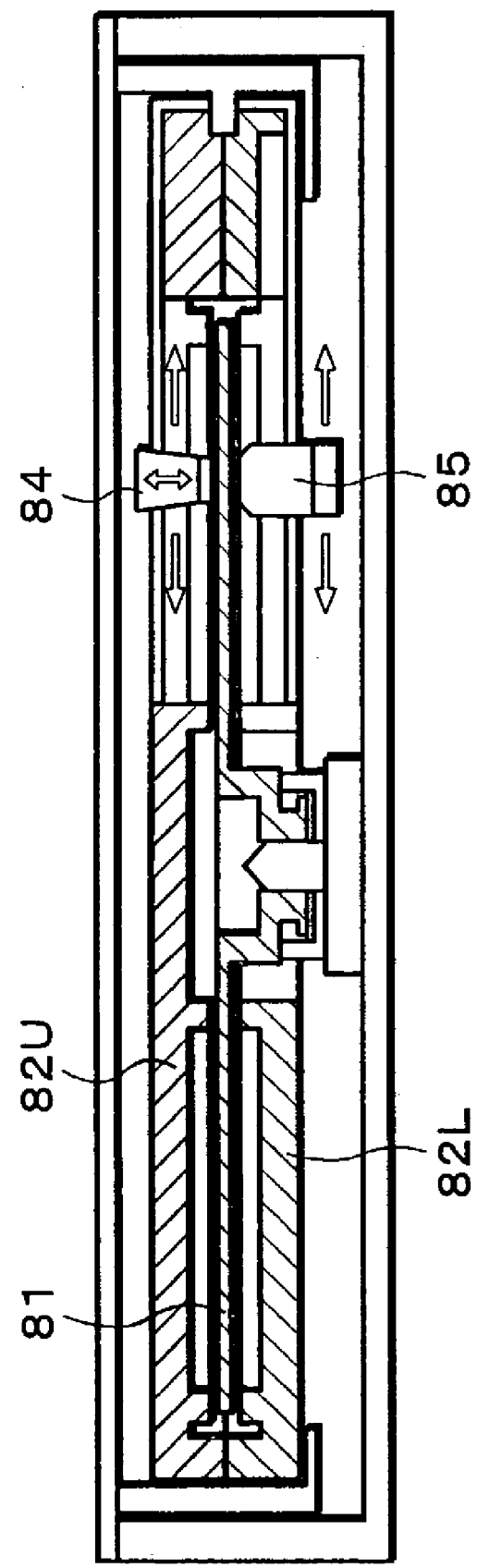
FIG. 23 is a cross-sectional view of a disc drive for using the conventional disc cartridge shown in FIG. 19 and the like figures.

On the other hand, the conventional disc cartridge shown in FIG. 23, which is provided with (a) an optical head 85 for projecting and detecting a laser beam and (b) a magnetic head 84 for applying a magnetic field, is so arranged that the optical head 85 is located underneath the disc 81, while the magnetic head 84 is positioned above the disc 81. Because the recording film is formed on the upper side of the disc 81, the magnetic field should be applied from above with respect to the disc 81. Otherwise, it is impossible to have a magnetic field strong enough for the recording. Moreover, it is necessary to move the magnetic head 84 close to the disc 81 after the insertion of the disc cartridge. Therefore, it is necessary to have a moving space (space for moving) between an upper surface of the disc cartridge and a upper cover of the disc drive so as to move the magnetic head 84 up and down.

More specifically, the disc drive of the present invention can be thinner than the conventional disc drive, which is thicker due to a thickness of the upper shell 82U, and a height and the moving space of the magnetic head 84. For example, in case an MD (Mini Disc) is used as the conventional disc cartridge, an upper shell is 2.5 mm thick, and it is necessary to have a moving space of 1.5 mm for a magnetic head. Therefore, the disc drive of the present embodiment is thinner by 4 mm compared with the conventional disc drive.

[Third Embodiment]

Still another embodiment of the present invention is explained below, with reference to figures. Note that members with same functions as those explained in the respective previous embodiments are labelled in the same fashion, and explanation of them is omitted here.

The present embodiment explains a disc drive employing a loading method different from the disc drive discussed in the second embodiment referring to FIG. 14 and other figures. The disc drive of the second embodiment uses the method in which the cartridge holder 33 is pulled out upwardly with respect to the disc drive so as to insert the disc cartridge therein, then the cartridge holer 33 is pushed back in the disc drive. On the contrary, the present embodiment employs a so-called front loading method, in which a side surface of the disc drive is provided with an inlet for the disc cartridge, and a cartridge holder 33 is moved downwardly inside the disc drive.

Figure 24:
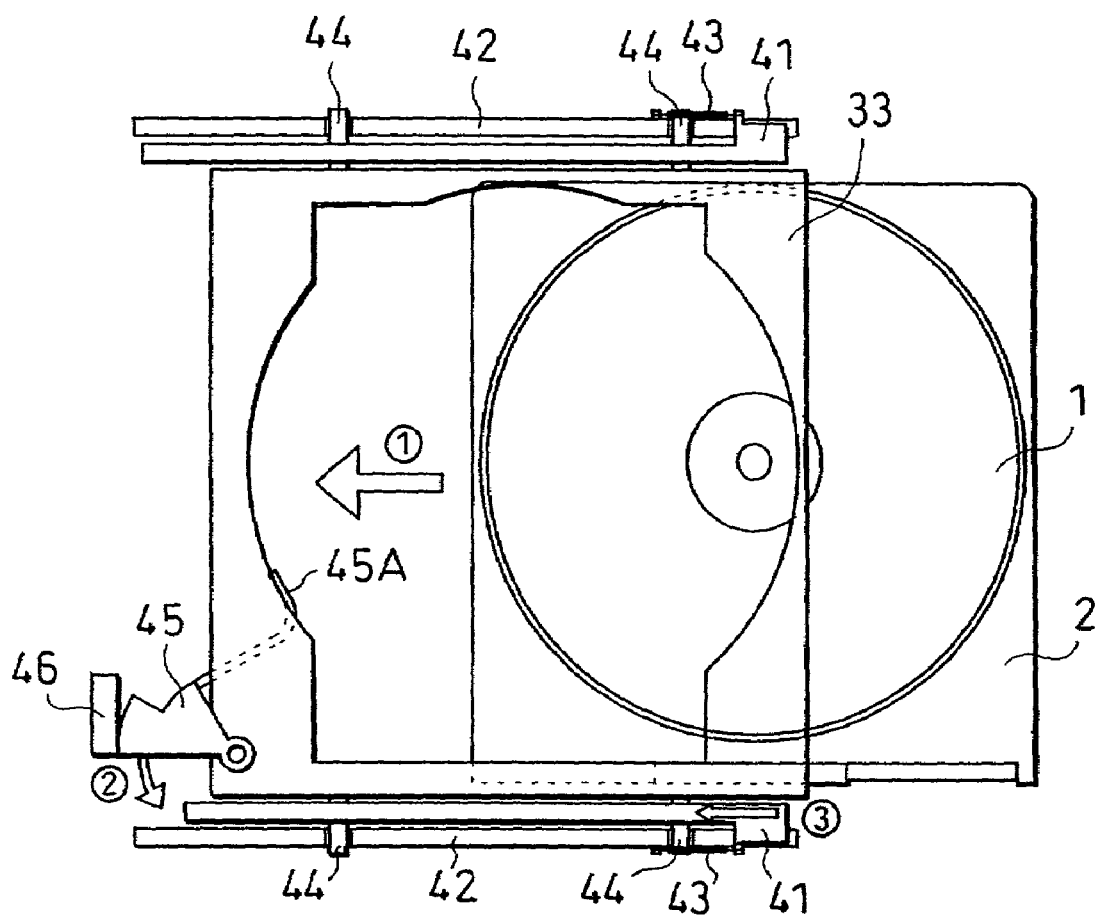
FIG. 24(a) is a plan view showing a loading system for a disc cartridge for use in a disc drive of still another embodiment of the present invention. Meanwhile.
FIG. 24(b) is a side view of FIG. 24(a).
Figure 24:
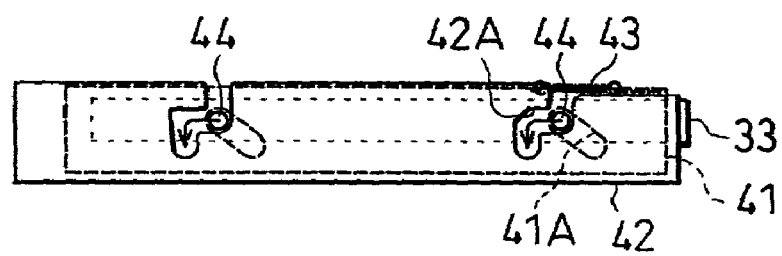
Figure 25:
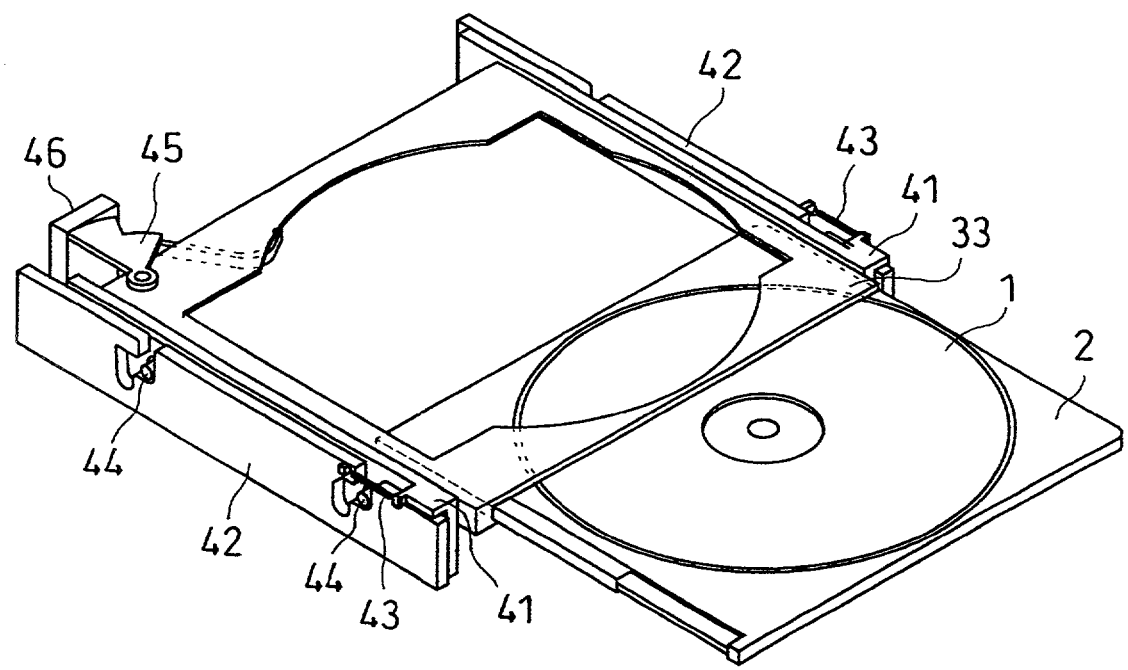
FIG. 25 is a perspective view of the loading system shown in FIGS. 24(a) and 24(b).

FIG. 24(*a*) is a plan view showing the loading system for the disc cartridge for use in the disc drive of the present embodiment. FIG. 24(*b*) is a side view of the FIG. 24(*a*). Moreover, FIG. 25 is a perspective view of the loading system shown in FIGS. 24(*a*) and 24(*b*).

As shown in those figures, the loading system is provided with one each of first and second rails 41 and 42 respectively on both sides of the cartridge holder 33 with respect to an inserting/unloading direction of the disc cartridge. The second rails 42 are fixed onto a disc drive main body (not shown), while the first rails 41 slide on the second rails 42 in the inserting/unloading direction of the disc cartridge.

Moreover, on both the sides of the cartridge holder 33, shafts 44 are provided. Further, the first rails 41 are respectively provided with first notched holes 41A, while the second rails 42 are respectively provided with second notched holes 42A. The respective shafts 44 respectively pass through both of the first notched holes 41A and the second notched holes 42A in this order.

The disc cartridge is inserted into the cartridge holder 33 in a direction indicated by an arrow ① in FIG. 24(*a*). Then, as the disc cartridges is moved further inwardly (inserted) to some extent, a side surface of a tip part of the disc cartridge with respect to the insertion direction is touched by an touching arm 45A of a cartridge holder stopper 45 provided on the cartridge holder 33. When the disc cartridge is moved still further inwardly, the cartridge holder stopper 45 is rotated in a direction indicated by an arrow ② in FIG. 24(*a*), so that the cartridge holder stopper 45 is unhooked from a projected section 46 that is fixed on a disc drive main body, so as to allow the cartridge holder 33 to move in the insertion direction.

Here, the first rail 41 is always pulled by a spring 43 in the insertion direction. Therefore, when the cartridge holder stopper 45 is unhooked from the projected section 46, the first rail 41 is moved, together with the shafts 44, along a path that is horizontal with a direction of the second notched hole 42A of the second rail 42. Thereafter, the shaft 44 is moved to an end of the path horizontal with the direction of the second notched hole 42A, then the shaft 44 is moved downward along a path vertical with the second notched hole 42A, by an effect of a shape of the first notched hole 41A of the first rail 41.

Figure 26:
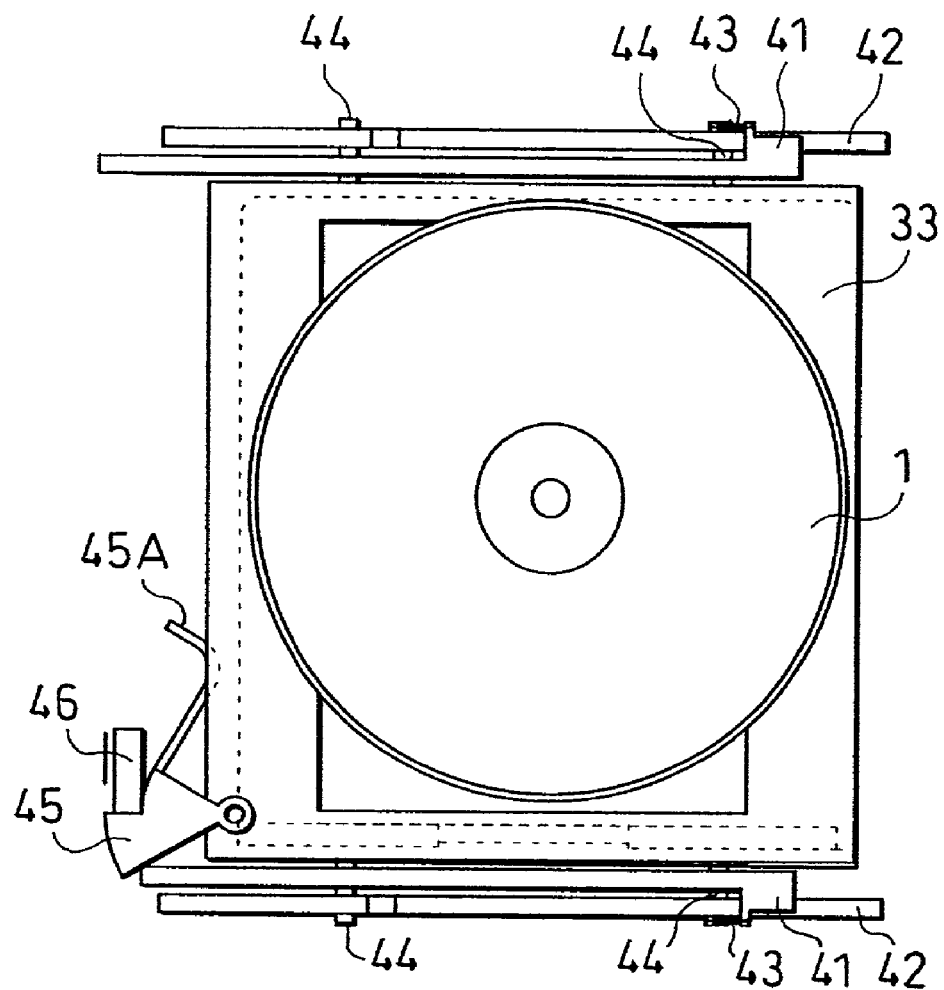
FIG. 26(a) is a plan view illustrating a state where insertion of the disc cartridge is completed in the loading system. Meanwhile.
FIG. 26(b) is a side view of FIG. 26 (a).
Figure 26:
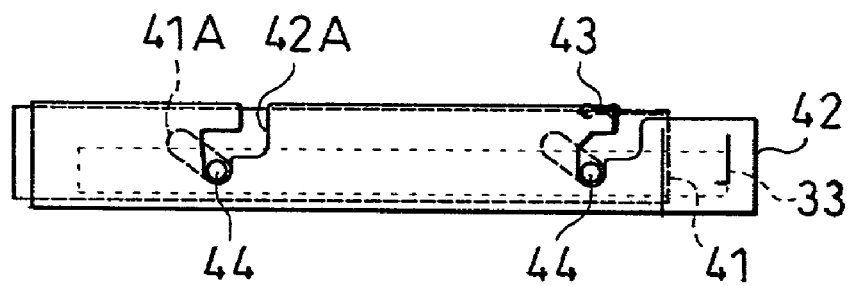
Figure 27:
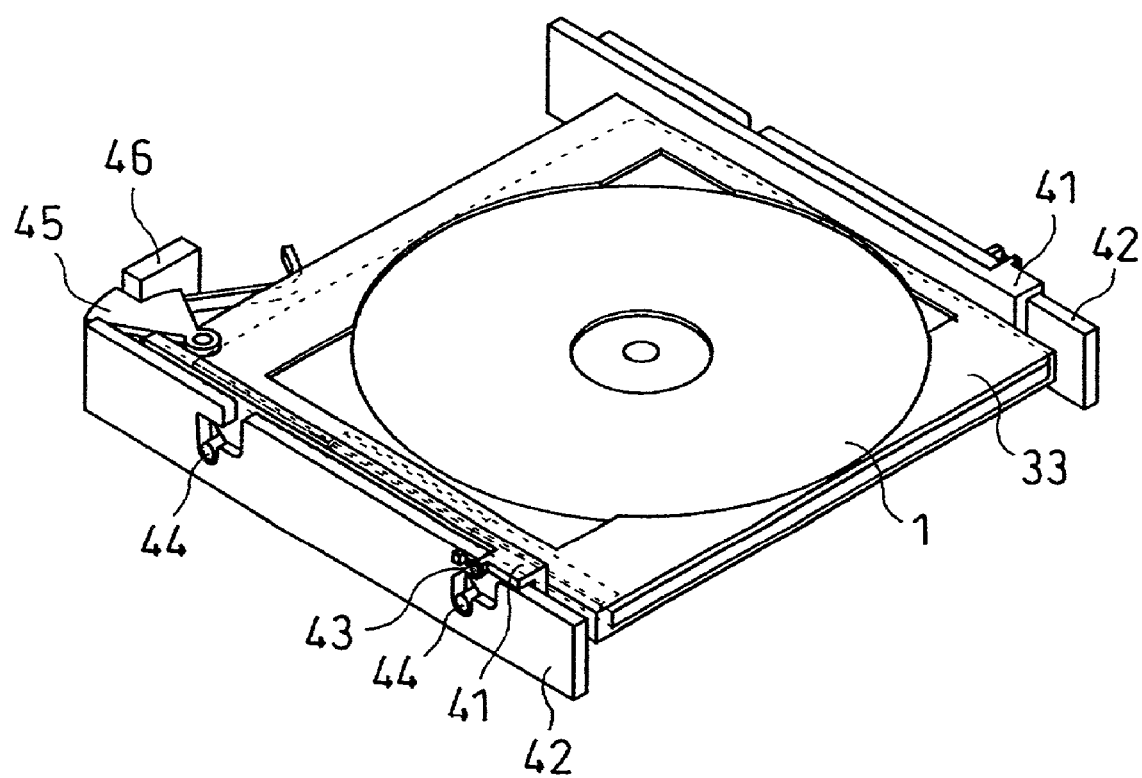
FIG. 27 is a perspective view of a loading system shown in FIGS. 26(a) and 26(b).

By means of the effects discussed above, the cartridge holder 33 is moved downwardly after the cartridge holder 33 is moved in the insertion direction as the disc cartridge is inserted. FIG. 26(*a*) is a plan view illustrating a state where the insertion of the disc cartridge is completed in the loading system. FIG. 26(*b*) is a side view of FIG. 26(*a*). Moreover, FIG. 27 is a perspective view of the loading system shown in FIGS. 26(*a*) and 26(*b*).

The loading system of the above arrangement may be applied, for example, in the disc drive discussed in the first embodiment, which is shown in FIGS. 4(*a*) to 4(*d*). In other words, it is possible to realize such an operation that only the disc cover 2 is moved downward so as to leave the disc 1 on the spindle motor 9 when the cartridge holder 33 is moved downward.

Furthermore, the disc drive for the disc cartridge with the shutter 30, which is discussed in the second embodiment, may employ the front loading method by having the above loading system. It should be noted that, for a disc drive of this kind, the disc cartridge is moved downwardly after the completion of the insertion so as to separate the disc cover 2 from the disc 1, while the disc 1 of the disc cartridge is placed on the spindle motor 9.

As discussed above, a disc cartridge of the present invention is provided with (a) a disc in a disc shape, including a recording layer for recording/reproducing information, (b) a disc cover for covering at least a part of one side of the disc, and (c) connecting means for connecting the disc and the disc cover, wherein a side of the disc, which is opposite to the side of the disc covered by the disc cover, is exposed externally.

Moreover, the disc cartridge of the present invention defined as above may be so arranged that the disc includes a disc substrate, the recording layer and a protective layer, which is transparent, in this order, wherein at least a part of a side of the disc, on which the protective layer is formed, is covered by the disc cover so that the side of the disc on which the protective layer is formed is subjected to light projected thereon, so as to record/reproduce information.

With the above arrangement, the side of the disc on which the transparent protective layer is formed is subjected to light projected thereon, so as to record/reproduce with respect to the disc. Therefore, compared with the arrangement where the light is projected onto the recording layer after passing through the transparent disc substrate as the case of the conventional optical disc, for example, the above arrangement can have a shorter distance between the head for emitting the light, and the recording layer, thereby having the shorter focal distance of the objective lens for focusing the light on the recording layer For this reason, the head for emitting the light can have smaller optical members including the objective lens and the like, thereby giving the head a smaller size. This provides the thinner disc drive and increases the access speed of the head.

Furthermore, because the disc substrate need not be able to pass through the light, it is not necessary to make the disc substrate of the transparent material. Therefore, the disc substrate can be made of a material selected from among more various materials. Thus, it is possible to increase a strength of the disc or to reduce the material cost.

Moreover, the disc cartridge of the present invention defined as above may be so arranged that the disc cover includes an outer touching section that touches the disc in a vicinity of an outer circumference thereof when the disc cover is connected with the disc.

With the above arrangement, where the circumference part of the disc is touched with the outer touching section of the disc cover when the disc and the disc cover is connected together, it is possible to prevent a foreign material such as the dust from invading, beyond the outer circumference part, a space surrounded by the disc and the disc cover. In this way, it is possible to enhance an anti-dust property of the space of the disc protected by the disc cover.

Moreover, the disc cartridge of the present invention defined as above may be so arranged that the outer touching section is made of an elastic material.

With the above arrangement, where the outer touching section is made of the elastic material, an external impact on the disc cartridge, for example, can be absorbed due to an elastic property of the outer touching section. Thus, it is possible to reduce possibility of damaging the disc, thereby giving the high impact resistance to the disc cartridge.

Furthermore, the disc cartridge of the present invention defined as above may be so arranged that the disc cover includes an inner touching section that touches the disc in a vicinity of an inner circumference thereof when the disc cover is connected with the disc.

With the above arrangement, where the inner part of the disc is touched with the inner touching section of the disc cover when the disc cover is connected with the disc, it is possible to prevent the foreign material such as the dust from invading, beyond the inner circumference part, the space surrounded by the disc and the disc cover. In this way, it is possible to enhance the anti-dust property of the space of the disc protected by the disc cover.

Moreover, the disc cartridge of the present invention, in addition to above arrangement, may be so arranged that the inner touching section is made of an elastic material.

With the above arrangement, where the inner touching section is made of the elastic material, the external impact on the disc cartridge, for example, can be absorbed due to an elastic property of the inner touching section. Thus, it is possible to reduce the possibility of damaging the disc, thereby giving the high impact resistance to the disc cartridge.

Furthermore, the disc cartridge of the present invention defined as above may be so arranged that the connecting means includes (a) a hub section in an inner circumference part of the disc and (b) an inner touching section of the disc cover, for touching the disc in a vicinity of an inner circumference thereof, both the hub section and the inner touching section having a magnetic material, so as to maintain the connection between the disc and the disc cover by a magnetic attractive force between the hub section and the inner touching section.

With the above arrangement, the connection between the disc and the disc cover are maintained by the magnetic attractive force between the hub section of the disc and the inner touching section of the disc cover, it is possible to separate the disc and the disc cover, which are usually connected, by means of an external forth beyond the magnetic attractive force. Therefore, it is possible to easily switch over whether the disc and the disc cover are connected or unconnected.

Moreover, the disc cartridge of the present invention defined as above may be so arranged that the disc has a disc projected section in an inner circumference part thereof, the disc projected section being projected toward the disc cover and having a recessed section on a side wall thereof, and the disc cover having a projecting section, so that the projecting section can be inserted in or pulled out with respect to the recessed section.

In the above arrangement, the disc projected section of the inner circumference part of the disc has the recessed section on the side wall thereof, while the disc cover is provided with the projecting section that can be inserted in or pulled out with respect to the recessed section. This maintains the connection between the disc and the disc cover when the projecting section of the disc cover is inserted within the recessed section of the disc projected section. Meanwhile, this does not maintain the connection between the disc and the disc cover when the projecting section of the disc cover is pulled out from the recessed section. Because of this, it is possible to easily switch over whether the disc and the disc cover are connected or unconnected. This also makes the connection more strong because the projecting section is mechanically inserted into the recessed section.

Moreover, the disc cartridge of the present invention defined as above may be so arranged that the disc cover includes a disc holding lock for mechanically holding an outer circumference part of the disc in such a manner that the disc holding lock switches over whether the outer circumference part of the disc is held or not.

With the above arrangement, it is possible to switches over whether the outer circumference part of the disc is held or not, by using the disc holding lock of the disc cover that switches over whether the outer circumference part of the disc is held or not. Therefore, it is possible to easily switch over whether the disc and the disc cover are connected or unconnected. This also makes the connection more strong because the disc and the disc cover are mechanically connected together.

Further, the disc cartridge of the present invention defined as above may be so arranged that the protective layer has a thickness ranging from 0 to 20 μm.

In the above arrangement, an upper limit of the protective layer as to the thickness thereof is 20 μm. When the recording is performed while the magnetic field is applied on the disc, this thickness makes it possible to apply the magnetic field from the side that is protected by the protected layer, in an enough magnetic strength for performing the recording. Therefore, it is possible to locate the optical head section for projecting the laser beam and the magnetic head section for applying the magnetic field in an outer position in the disc, with respect to the surface where the protective layer is. In other words, it is not necessary to apply the magnetic field from the surface opposite to the light incident surface of the disc by using the magnetic head, unlike the conventional arrangement. Therefore, it is unnecessary to take into consideration the slipperiness of the surface opposite to the light incident surface of the disc. Moreover, because the optical head section and the magnetic head section are located on one side with respect to the disc, it is possible to give a thinner thickness to the disc drive, compared with the conventional arrangement where the optical head section is located on one side and the magnetic head section on the other side with respect to the disc.

Furthermore, with the above arrangement, a lower limit of the protective layer as to the thickness thereof is 0. This corresponds to an arrangement where no protective layer is provided. This arrangement is possible because the recording layer is basically protected by the disc cover, even without the protective layer, thereby significantly lowering possibility that the recording layer is damage by the external impact, is attached with the dust or becomes dirty.

Moreover, the disc cartridge of the present invention defined as above may be so arranged that the disc substrate is made of an anti-static material.

With the above arrangement, where the disc substrate has an anti-static property, it is possible to reduce attachment of the dust and the like on the surface of the disc.

Furthermore, the disc cartridge of the present invention defined as above may be so arranged that the disc substrate is made of a material selected from resins, metals and glasses.

The above arrangement, in case the disc substrate is made of a resin, gives the following advantages. Specifically, the resins are suitable for the mass production because the resins are manufactured by the compression molding. Further, the raw materials of the resins are low in cost. Therefore, the material cost and the manufacturing cost of the disc substrate can be reduced. In addition, when the disc substrate is made of a metal, the above arrangement gives such advantages that the material cost and the manufacturing cost of the disc substrate can be lowered because the metals can be easily produced by the press working and the raw materials of the metals are low in cost and high in strength. Moreover, when the disc substrate is made of a glass, the above arrangement gives such advantages that the disc substrate having the high reliability can be offered because the glasses are excellent in the flatness and hardness, while the glasses are optically stable.

Further, it is also possible to minimizes occurrence of damages on a side where no disc cover is provided, because the resins, metals and glasses are materials having a hardness to some extent.

Moreover, the disc cartridge of the present invention defined as above may be so arranged that the protective layer is made of an anti-static material.

With the above arrangement, where the protective layer has the anti-static property, it is possible to reduce attachment of the dust and the like on the surface of the protective layer due to electrification of the protective layer, thereby alleviating an adverse effect on the recording/reproducing of the information.

Furthermore, the disc cartridge of the present invention defined as above may be so arranged that the protective layer is made of a material whose surface is slippery.

With the above arrangement, where the protective layer has a slippery surface, the access of the head to the disc in order to record/reproduce makes no undesirable resistance or does not disturb an air layer between the head and the disc.

Furthermore, the disc cartridge of the present invention defined as above may be so arranged that the protective layer is made of a material selected from resins and glasses.

The above arrangement, in case the protective layer is made of a resin, has the following advantages. Specifically, the resins are suitable for the mass production because the resins can be manufactured by the die-case method, spin-coating or the like, and the raw materials of the resins are low in cost. This leads to the reduction in the material cost and the manufacturing cost, while giving the anti-static property or surface slipperiness to the protective layer. Moreover, when the protective layer is made of a glass, the above arrangements gives the following advantages. Thus, the glasses, which are excellent in the flatness and hardness, and are optically stable, offers a highly reliable protective layer, while adding the anti-static property and surface slipperiness to the protective layer. In addition, because the resins and the glasses can be a transparent material, it is possible to direct the light beam onto the recording layer appropriately when the recording or the reproduction is performed.

Furthermore, the disc cartridge of the present invention defined as above may be so arranged that at least a part of the disc cover is made of a material selected from resins and metals.

The above arrangement, in case the disc cover is made of a resin, has the following advantages. Specifically, the resins are suitable for the mass production because the resins can be manufactured by the compression molding, and the raw materials of the resins are low in cost. This leads to the reduction in the material cost and the manufacturing cost of the disc cover. Moreover, when the disc cover is made of a metal, the above arrangement gives the following arrangement. In short, the metals are easily produced by the press working, while its raw materials are low in price and high in strength. This leads to the reduction of the material cost and the manufacturing cost of the disc cover.

In addition, because the resins and the metals are materials having a strength to some extent, it is possible to protect the disc appropriately.

Furthermore, the disc cartridge of the present invention defined as above may be so arranged that the disc cover has a side wall around an outer circumference thereof, the side wall being projected toward the disc so as to protect an outer circumference side surface of the disc.

With the above arrangement, where the disc outer circumference part of the disc is protected by the side wall around the outer circumference of the disc, it is possible to protect the disc from the impact applied sidewardly. Thus, this provides the disc cartridge with a strong impact resistance.

Moreover, the disc cartridge of the present invention defined as above may be so arranged that the disc cover has a region which has no side wall in at least part of the outer circumference of the disc cover.

With the above arrangement, for example, in case of the use of the disc drive which separates the disc and the disc cover from each other, and inserts a head therebetween so as to record/reproduce, it is possible to insert the head through the region which has no side wall. In this case, shorter is the distance made between the disc and the disc cover by the separation, compared with the case where the head is inserted through the region having the side wall. Thus, it is possible to reduce the thickness of the disc drive.

Moreover, the disc cartridge of the present invention defined as above may be so arranged that at least a part of the side wall is for opening/closing.

Similarly to the above case, with the above arrangement, for example, in case of the use of the disc drive which separates the disc and the disc cover from each other, and inserts a head therebetween so as to record/reproduce, it is possible to insert the head through the region in which the side wall is opened. In this case, shorter is the distance made between the disc and the disc cover by the separation, compared with the case where the head is inserted through the region having the side wall. Thus, it is possible to reduce the thickness of the disc drive.

Furthermore, the disc cartridge of the present invention defined as above may be so arranged that the disc cover includes a shutter for switching over whether the disc is exposed or unexposed.

With the above arrangement, the shutter provided in the disc cover switches over whether the disc is exposed or unexposed. Thus, it is possible to close the shutter, for example, when the disc cartridge is carried around or stored. On the other hand, it is possible to open the shutter to insert the head when the recording or the reproduction is carried out in the disc drive.

Moreover, a disc drive of the present invention, which is for using the disc cartridge of the present invention, is provided with (a) a head for recording/reproducing with respect to the disc, and (b) separating means for separating the disc and the disc cover, so as to allow the head to be inserted between the disc and disc cover so that the recording/reproducing is performed.

Furthermore, the disc drive of the present invention defined as above, is further provided with a spindle motor for rotating the disc, wherein the separating means acts as moving means for moving the disc cover in a direction of a rotation axis of the disc, while leaving the disc on the spindle motor, so as to separate the disc and the disc cover, when the disc cartridge is inserted to be placed on the spindle motor.

With the above arrangement, the disc and the disc cover are separated from each other by moving only the disc cover from the disc cartridge that is inserted and located on the spindle motor, while the disc is left on the spindle motor. In short, the disc cartridge gets ready for the recording/reproducing operation by moving only the disc cover after the insertion of the disc cartridge. In this manner, it is possible to separate the disc and the disc cover with a simple arrangement and in a short time.

Moreover, the disc drive defined as above may be so arranged that the spindle motor holds the disc by a magnetic attractive force.

With the above arrangement, the disc is held by the spindle motor by means of the magnetic attractive force, with a simple system for holding the disc on the spindle motor. In addition, a time required by the spindle motor so as to hold the disc becomes shorter with the above arrangement. Thus, it is possible to set up in a short time.

Furthermore, a disc drive of the present invention, which is for using a disc cartridge of the present invention, is provided with (a) a head for recording/reproducing with respect to the disc, and (b) shutter opening/closing means for opening/closing the shutter, wherein the head is moved close to the disc that is exposed through the shutter opened by the shutter opening/closing means, so that the recording/reproducing is performed.

Moreover, the disc drive of the present invention defined as above may be so arranged that the head includes a magnetic head section for applying a magnetic field onto the disc, and an optical head section for projecting and detecting a laser beam.

With the above arrangement, where the head section is provided with the magnetic head section for applying the magnetic field and the optical head section for projecting and the detecting the laser beam, one side of the disc can be subjected to the magnetic field applied thereon and the laser beam projected thereon. Thus, comparing with, for example, the conventional arrangement where the application of the magnetic field and the projection of the laser beam are performed on the different sides respectively, the disc drive has a thinner thickness.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A disc cartridge, comprising:
   a disc in a disc shape, including a recording layer for recording/reproducing information;
   a disc cover for covering at least a surface for recording/reproducing, which is accessed by a head for recording/reproducing information with respect to the disc; and
   connecting means for connecting the disc and the disc cover,
   wherein a side of the disc, which is opposite to the side of the disc covered by the disc cover, is exposed externally,
   the disc has a disc projected section in an inner circumference part of the disc, the disc projected section being projected toward the disc cover,
   the connecting means is a movable projecting section provided on the disc cover, and one end of the movable projecting section is inserted in or pulled out with respect to a recessed section provided on a side wall of the disc projected section, and
   when the one end of the movable projecting section goes into the recessed section, an opposite end of the movable projecting section is hooked and stopped by a recessed hooked section inside the disc cover.

2. The disc cartridge as set forth in claim 1, wherein the disc includes a disc substrate, the recording layer, and a protective layer, which is transparent, in this order, wherein the at least part of the side of the disc, on which the protective layer is formed, is covered by the disc cover so that the side of the disc on which the protective layer is formed is subjected to light projected thereon, so as to record/reproduce information.

3. The disc cartridge as set forth in claim 1, wherein the disc cover includes an outer touching section that touches the disc in a vicinity of an outer circumference thereof when the disc cover is connected with the disc.

4. The disc cartridge as set forth in claim 3, wherein the outer touching section is made of an elastic material.

5. The disc cartridge as set forth in claim 1, wherein the disc cover includes an inner touching section that touches the disc in a vicinity of an inner circumference thereof when the disc cover is connected with the disc.

6. The disc cartridge as set forth in claim 5, wherein the inner touching section is made of an elastic material.

7. The disc cartridge as set forth in claim 2, wherein the protective layer has a thickness ranging from 0 to 20 µm.

8. The disc cartridge as set forth in claim 1, wherein the disc has a disc projected section in an inner circumference part thereof, the disc projected section being projected toward the disc cover and having a recessed section on a side wall thereof, and the disc cover having a projecting section, so that the projecting section is inserted in or pulled out with respect to the recessed section.

9. The disc cartridge as set forth in claim 2, wherein the disc substrate is made of a material selected from resins, metals and glasses.

10. The disc cartridge as set forth in claim 2, wherein the protective layer is made of an anti-static material.

11. The disc cartridge as set forth in claim 2, wherein the protective layer is made of a material whose surface is slippery.

12. The disc cartridge as set forth in claim 2, wherein the protective layer is made of a material selected from resins and glasses.

13. The disc cartridge as set forth in claim 1, wherein at least a part of the disc cover is made of a material selected from resins and metals.

14. The disc cartridge as set forth in claim 1 wherein the disc cover has a side wall around an outer circumference thereof, the side wall being projected toward the disc so as to protect an outer circumference side surface of the disc.

15. The disc cartridge as set forth in claim 14, wherein the disc cover has a region which has no side wall in at least part of the outer circumference of the disc cover.

16. The disc cartridge as set forth in claim 14, wherein at least a part of the side wall is for opening/closing.

17. The disc cartridge as set forth in claim 1, the disc cover includes a shutter for switching between an open position in which the surface for recording/reproducing of the disc is exposed and a closed position.

18. The disc cartridge as set forth in claim 1, wherein
the disc cover includes a shutter for switching over whether the disc is exposed or unexposed, the shutter having a holding notched section for holding the disc projected section so that the shutter functions as the movable section, and
when the shutter is closed, the holding notched section causes the disc projected section provided in the inner circumference part of the disc to be hooked and fixed therein.

19. The disc cartridge as set forth in claim 18, wherein when the disc cartridge is inserted into a disc drive, the shutter is opened thus unlocking the disc and the disc cover.

20. A disc drive for using the disc cartridge as set forth in claim 19, the disc drive comprising:
the head for recording/reproducing with respect to the disc; and
shutter opening/closing means for opening/closing the shutter,
when the disc cartridge is completely inserted in the disc drive, the head accesses the disc that is exposed through the shutter opened by the shutter opening/closing means.

21. The disc cartridge as set forth in claim 20, wherein the head includes a magnetic head section for applying a magnetic field onto the disc, and an optical head section for projecting and detecting a laser beam.

22. A disc cartridge, comprising:
a disc in a disc shape, including a recording layer for recording/reproducing information;
a disc cover for covering at least a surface for recording/reproducing, which is accessed by a head for recording/reproducing information with respect to the disc;
connecting means for connecting the disc and the disc cover; and a disc holding lock, provided on the disc cover, for mechanically holding an outer circumference part of the disc,
wherein a side of the disc, which is opposite to the side of the disc covered by the disc cover, is exposed externally, and
one end of the disc holding lock is for holding the disc, and the other end thereof moves to switch over whether the one end of the disc holding lock holds or stops holding the disc, wherein when the disc holding lock is positioned to hold the disc, a projecting section for unlocking the disc holding lock is projected into a ditch provided on a side wall of the disc cover.

23. The disc cartridge as set forth in claim 22, wherein the disc cover has a side wall around an outer circumference thereof, the side wall being projected toward the disc.

24. The disc cartridge as set forth in claim 22, wherein the disc holding lock is rotated arbitrarily, and
according to a rotation angle of the disc holding lock, the other end thereof switches over whether the one end of the disc holding lock holds or stops holding the disc.

25. The disc cartridge as set forth in claim 22,
wherein the disc cover includes a shutter for switching between an open position in which the surface for recording/reproducing of the disc is exposed and a closed position.

26. A disc drive for using the disc cartridge as set forth in claim 25, the disc drive comprising:
the head for recording/reproducing with respect to the disc; and
shutter opening/closing means for opening/closing the shutter,
wherein when the disc cartridge is loaded in the disc drive, the head is moved close to the disc that is exposed through the shutter opened by the shutter opening/closing means.

27. The disc drive as set forth in claim 26, wherein the head includes a magnetic head section for applying a magnetic field onto the disc, and an optical head section for projecting and detecting a laser beam.

28. The disc cartridge as set forth in claim 23, wherein the disc cover has a region which has no side wall in at least part of the outer circumference of the disc cover.

29. The disc cartridge as set forth in claim 23, wherein at least a part of the side wall is for opening/closing.

30. The disc cartridge as set forth in claim 22, wherein when the disc cartridge is inserted into a disc drive, the disc projecting section for releasing the lock of the disc is pushed into the disc drive and inserted into a bottom of the ditch, thus causing a non-holding state.

31. A disc drive for using the disc cartridge as set forth in claim 30, the disc drive comprising:
the head for recording/reproducing with respect to the disc; and
separating means for separating the disc and the disc cover,
wherein the separating means is a projected section formed along the side wall of the disc cover,
when the disc cartridge is inserted in the disc drive, the projected section pushes one end of the disc holding lock, thus unlocking the disc, and
the head is inserted between the disc and the disc cover so that the recording/reproducing is performed.

32. The disc drive as set forth in claim 31, wherein the head includes a magnetic head section for applying a magnetic field onto the disc, and an optical head section for projecting and detecting a laser beam.

33. The disc cartridge as set forth in claim 22, wherein the disc includes a disc substrate, the recording layer, and a protective layer, which is transparent, in this order, wherein the at least part of the side of the disc on which the protective layer is formed is covered by the disc cover so that the side of the disc on which the protective layer is formed is subjected to light projected thereon, so as to record/reproduce information.

34. The disc cartridge as set forth in claim 22, wherein the disc cover includes an outer touching section that touches the disc in a vicinity of an outer circumference thereof when the disc cover is connected with the disc.

35. The disc cartridge as set forth in claim 34, wherein the outer touching section is made of an elastic material.

36. The disc cartridge as set forth in claim 22, wherein the disc cover includes an inner touching section that touches the disc in a vicinity of an inner circumference thereof when the disc cover is connected with the disc.

37. The disc cartridge as set forth in claim 36, wherein the inner touching section is made of an elastic material.

38. The disc cartridge as set forth in claim 33, wherein the protective layer has a thickness ranging from about 0 to 20 µm.

39. The disc cartridge as set forth in claim 33, wherein the disc substrate is made of an anti-static material.

40. The disc cartridge as set forth in claim 33, wherein the disc substrate is made of a material selected from resins, metals, and glasses.

41. The disc cartridge as set forth in claim 33, wherein the protective layer is made of anti-static material.

42. The disc cartridge as set forth in claim 33, wherein the protective layer is made of a material whose surface is slippery.

43. The disc cartridge as set forth in claim 33, wherein the protective layer is made of a material selected from resins, metals, and glasses.

44. The disc cartridge as set forth in claim 33, wherein at least a part of the disc cover is made of a material selected from resins, metals, and glasses.

* * * * *